United States Patent
Kalvenes et al.

(10) Patent No.: US 12,032,392 B2
(45) Date of Patent: Jul. 9, 2024

(54) BLENDING FLOW CONFIGURATION ENGINE IN A MATERIAL PROCESSING SYSTEM

(71) Applicant: The Boston Consulting Group, Inc., Boston, MA (US)

(72) Inventors: Joakim Kalvenes, Glencoe, IL (US); Jason Thomas Stewart, Venice, IL (US); John Thomas Clark, Jr., North Salt Lake, UT (US); Rohin Wood, Perth (AU)

(73) Assignee: THE BOSTON CONSULTING GROUP, INC., Boston, MA (US)

( * ) Notice: Subject to any disclaimer, the term of this patent is extended or adjusted under 35 U.S.C. 154(b) by 306 days.

(21) Appl. No.: 17/666,300

(22) Filed: Feb. 7, 2022

(65) Prior Publication Data

US 2023/0007852 A1    Jan. 12, 2023

Related U.S. Application Data

(60) Provisional application No. 63/219,606, filed on Jul. 8, 2021.

(51) Int. Cl.
*G05D 11/13*     (2006.01)
*B01F 23/60*     (2022.01)
(Continued)

(52) U.S. Cl.
CPC .............. *G05D 11/13* (2013.01); *B01F 23/69* (2022.01); *B01F 35/2205* (2022.01);
(Continued)

(58) Field of Classification Search
CPC ..... G05D 11/13; B01F 23/69; B01F 35/2205; B01F 35/83; G05B 17/02; G05B 19/4183; G05B 19/41855; G05B 19/41865
See application file for complete search history.

(56) References Cited

U.S. PATENT DOCUMENTS 6,234,318 B1     5/2001  Breau et al.
8,086,344 B1 *  12/2011  Mishra ................ G06Q 10/087
                                                              700/214
(Continued)

FOREIGN PATENT DOCUMENTS

CN         103365209         10/2013
CN         108171378          6/2018
(Continued)

OTHER PUBLICATIONS

International Search Report and Written Opinion in International Appln. No. PCT/US2022/036572, mailed on Oct. 25, 2022, 13 pages.
(Continued)

*Primary Examiner* — Chad G Erdman
(74) *Attorney, Agent, or Firm* — Fish & Richardson P.C.

(57) ABSTRACT

Methods, systems, and computer storage media for providing a blending flow configuration for a material processing system that blends a material from multiple sources. A blending flow configuration identifies an arrangement of components and settings of the components in the material processing system to support blending a material. The blending flow configuration can support optimizing outcomes of different types of downstream processes. The material properties data are identified based on different types of measurements. For example, block models, lab assays, and on-stream analyzers can be used to determine a composition of the material. Grinding line performance data (or grinding line operation data) that estimates the grinding line performance or capacity can also be accessed. A description of a conveyance network design of the material processing system is generated. The conveyance network design can specifically help identify source nodes, sink nodes, transshipments nodes, and network arcs of the material processing system.

17 Claims, 14 Drawing Sheets

(51) Int. Cl.
*B01F 35/22* (2022.01)
*B01F 35/83* (2022.01)
*G05B 17/02* (2006.01)
*G05B 19/418* (2006.01)

(52) U.S. Cl.
CPC .............. *B01F 35/83* (2022.01); *G05B 17/02* (2013.01); *G05B 19/4183* (2013.01); *G05B 19/41855* (2013.01); *G05B 19/41865* (2013.01)

(56) References Cited

U.S. PATENT DOCUMENTS

| | | |
|---|---|---|
| 9,422,116 B1 * | 8/2016 | Hase ..................... B65G 43/10 |
| 2011/0089270 A1 * | 4/2011 | Juha ....................... B02C 21/00 |
| | | 241/34 |
| 2016/0364649 A1 | 12/2016 | Ding et al. |
| 2019/0248578 A1 * | 8/2019 | Managan, II ......... B01F 35/881 |
| 2023/0008357 A1 | 1/2023 | Kalvenes et al. |

FOREIGN PATENT DOCUMENTS

| | | | |
|---|---|---|---|
| JP | 2020149607 A * | 9/2020 | |
| WO | WO-2006021052 A1 * | 3/2006 | ............. G06Q 10/08 |
| WO | WO 2022/034512 | 2/2022 | |

OTHER PUBLICATIONS

International Search Report and Written Opinion in International Appln. No. PCT/US2023/036426, mailed on Feb. 23, 2024, 9 pages.

* cited by examiner

BLENDING FLOW CONFIGURATION ENGINE IN A MATERIAL PROCESSING SYSTEM

CROSS-REFERENCE SECTION

The present application claims the benefit of U.S. Provisional Application No. 63/219,606, filed Jul. 8, 2021 and entitled "MATERIAL PROCESSING SYSTEM", the entirety of which is incorporated by reference herein.

BACKGROUND

Many companies rely on material processing systems for mechanical movement of materials from one location to another. Material processing systems can be especially useful for transporting heavy or bulky materials. For example, a mining company may rely on a material processing system—with a conveyor network—to support the extraction of valuable minerals or geological materials from the earth. A material processing system can operate based on a conveyor network having a conveyor network flow logic. The conveyor network can include different sections connected together to enable transporting materials based on the configuration of the network flow logic.

Conventional material processing systems (e.g., mining processing system) are not configured with a computing infrastructure and logic for processing materials with diverse properties, and in particular, blending and managing materials with diverse properties from multiple sources. For example, there previously existed no motivation to configure a material processing system to optimally handle different types of ores with diverse hardness or softness. Conventional material processing systems are also often designed with a single source-to-sink configuration without support for blending. Even with multiple grinding lines, it is common to have one pit to one crusher, and parallel grinding lines processing the same material. Moreover, there previously existed predominantly manual methods for optimizing a material processing system to minimize conveyor overflows, while meeting other requirements or goals of the material processing system. As such, a more comprehensive material processing system—having an alternative basis for providing material processing system configurations and operations—can improve processing techniques provided using material processing systems.

SUMMARY

Various aspects of the technology described herein are generally directed to systems, methods, and computer storage media, for among other things, providing a blending flow configuration for a material processing system that blends a material from multiple sources. A blending flow configuration identifies an arrangement of components and settings of the components in the material processing system to support blending a material (e.g., mineral). The blending flow configuration can support optimizing outcomes of different types of downstream processes. The material properties data are identified based on different types of measurements. For example, block models, lab assays, and on-stream analyzers can be used to determine a composition of the material (e.g., hardness or softness of ores from an ore mining pit). Grinding line performance data (or grinding line operation data) that estimates the grinding line performance or capacity can also be accessed. A description of a conveyance network design (i.e., conveyance network data) of the material processing system is generated. The conveyance network design can specifically help identify source nodes, sink nodes, transshipments nodes, and network arcs of the material processing system.

In operation, sink nodes (i.e., stockpiles) can be configured to support blending a material. In particular, sink nodes are associated with grinding line performance data (e.g., an efficiency of processing a mineralogical property at each source node) that is a factor in blending the material. Network arcs of the conveyance network are labeled as interrupted source-sink paths or uninterrupted source-sink paths. Uninterrupted source-sink paths are configured with fixed routing logic or variable routing logic. The interrupted source-sink paths are configurable with a variable speed routing logic. Interrupted source-sink paths are further configurable with a blending ratio associated with the materials received from a first source. Based on the configurations of the uninterrupted source-sink and the interrupted source-sink, each of the plurality of sources is assigned a maximum throughput setting for a predefined period of time.

Various aspects of the technology described herein are generally directed to systems, methods, and computer storage media, for among other things, providing an overflow management configuration for a material processing system that blends a material from multiple sources. The overflow management configuration identifies an arrangement of components and settings of the components in the material processing system to support blending a material (e.g., mineral) while reducing a risk of overflow. The material properties data are identified based on different types of measurements. For example, block models, lab assays, and on-stream analyzers can be used to determine the composition of the material (e.g., hardness or softness of ores from an ore mining pit). Grinding line performance data (or grinding line operation data) that estimates the grinding line performance or capacity can also be accessed. A description of a conveyance network design (i.e., conveyance network data) of the material processing system is generated. The conveyance network design can specifically help identify source nodes, sink nodes, transshipments nodes, and network arcs of the material processing system.

In operation, each edge (i.e., between conveyers) is configurable with a binary routing logic or a variable routing logic. Based on the routing logic, a delivery schedule for the material in a batch size (e.g., fixed batches of a haul truck size) is determined, where the delivery schedule identifies a surging period and an at rest period. For example, the at-rest period indicates 0 flow, the surging period indicates flow corresponding to an identified batch size. Average flows can be average total tonnage for a given time period across all haul surges. The expected material values are calculated as a function of the batch sizes, the sources, and a type of surge activity. For each network edge, the surge flow routing logic can be used to determine source nodes that pose a calculated overflow risk. Additional constraints are configurable such that no node has a max risk of exceeding its capacity, and an expected value flows are computed to meet stockpile height requirements.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The technology described herein is described in detail below with reference to the attached drawing figures, wherein.

DETAILED DESCRIPTION OF THE INVENTION

Overview

Figure 1A:
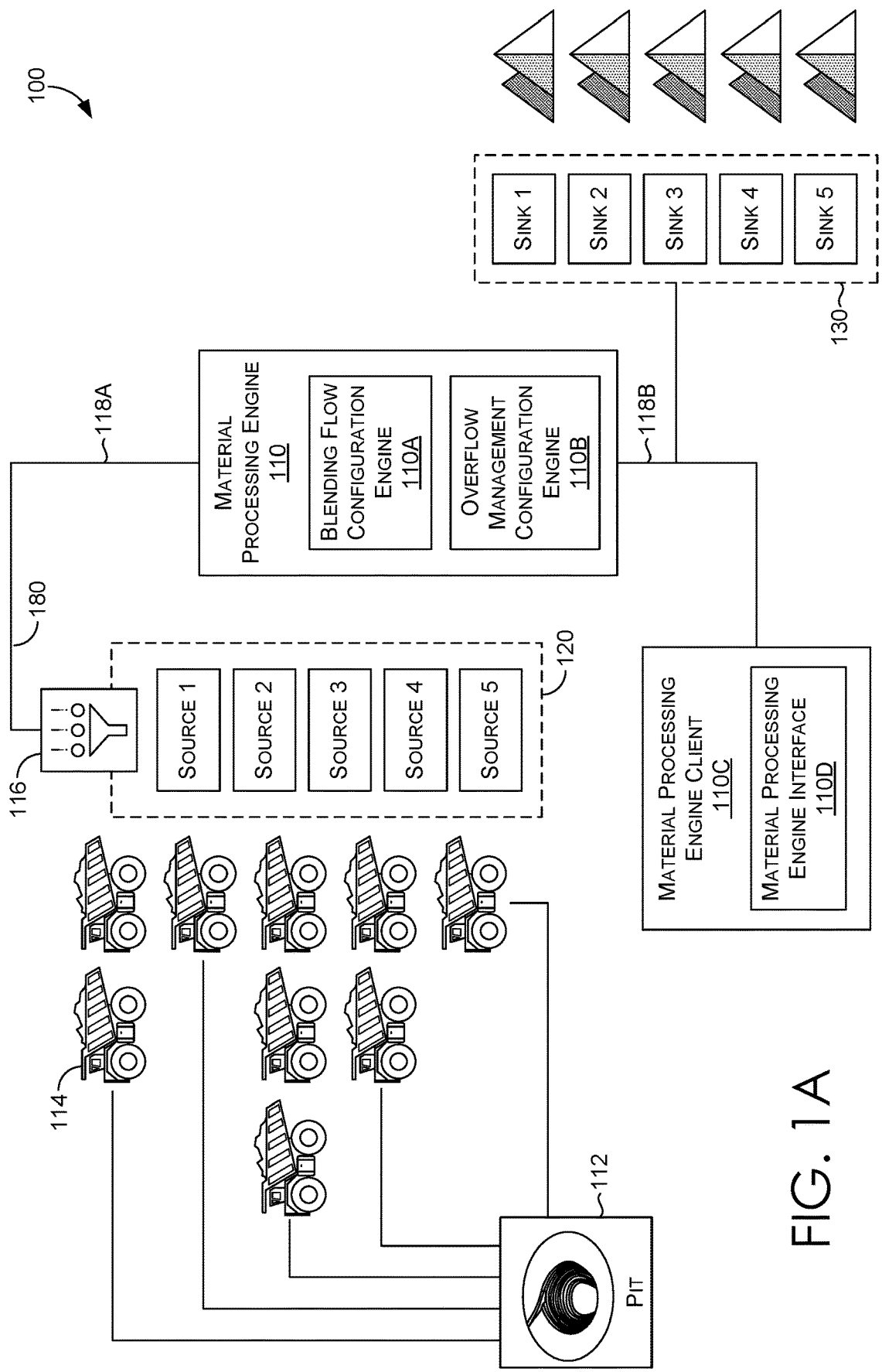
FIGS. 1A-1E are block diagrams of an exemplary material processing system with a material processing engine, in which embodiments described herein may be employed.

By way of background, a material processing system can be associated with an industrial environment that manages continuous flow of a material as the material is being processed. The material processing system can refer to a complex physical manufacturing system or mining processing system that supports and processes continuous flow of a particular material. During the continuous material flow, the material processing system can extract a particular material property from the material. For example, the material processing system can include components that support extracting a valuable mineral from ores that are in a continuous flow process in the material processing system. The material processing system can also include on-premise gathering of data. Data can be gathered—using sensors and computing components where computing components process the data—to improve the material processing system. For example, sensors can measure different types of variables—including temperature, vibrations, acidity—where the data is gathered and stored in a database.

Material processing systems can be used in different contexts to support transporting materials from a source to a destination. For example, a mineral processing system (e.g., mining processing) can refer to a type of material processing system that supports extraction of valuable minerals or geological materials from the earth. A material processing system can be schematically represented using a network flow, which is a directed graph where each edge has a capacity and each edge receives a flow. The network flow can typically be used to model problems—involving the transportation of items between locations—using a network of routes with limited capacity. The directed graph is called the network, the vertices are called nodes and the edges are called arcs. Examples include modeling traffic on a network of roads, fluid in a network of pipes, and electricity in a network of circuit components. With reference to mineral processing systems, a network flow can be used to model the flow of materials.

Conventionally, a material processing system—or mineral processing system (used interchangeably)—can be designed around hauling efficiency, which minimizes wait time for trucks or maximizes the number of tons transported for a fixed period of time. Such systems can further be naively configured as a single source-to-destination pair, without combining multiple sources to a single conveyor. Moreover, extensive mine planning in a mineral processing system is also not very common, as such, certain efficiencies can be gained from developing different schemes in combining multiple sources, mining planning and ore processing. For example, if a mining pit has diversity in ores, with some mine planning, more efficient methods for processing the ores can be developed. For example, ores can be pooled together or blended together using a material processing system, where pooling (a mix of materials in terms of percentage contribution) can be modeled as a non-linear problem in a network flow, in contrast to blending (a mix of materials in terms of absolute contribution) that can be modeled as a linear problem in a network flow. As such, sophistication in mine planning operations have created the diversity in ores being mined (i.e., ores with different types of hardness or softness) which introduces a different type of problem for material processing systems.

Conventional material processing systems are not configured with a computing infrastructure and logic for processing materials with diverse properties, and in particular, blending and managing materials with diverse properties from multiple sources. For example, there existed no motivation to configure a material processing system to optimally handle on-conveyor blending of ores with diverse hardness or softness. In this way, conventional material processing systems do not have logic to address the issue of blending minerals from multiple sources. Moreover, there exists—not only, diversity in the properties of the mineral—but also—diversity in the ability to process the minerals (e.g., grinding lines with different capabilities)—which conventionally have not been leveraged in combination when designing mineral processing network for improved efficiency.

Merging materials from different sources to create a blend introduces operational complexity based on material properties and the relative efficiency of grinding lines. For example, different batches of the ore can have certain characteristics based on geological evaluation. Grinding lines (e.g., grinding to turn rock into fine power) have different capabilities for processing the different batches of the ore. For example, a first grinding line is capable of grinding through a ton hard ore or grind through two tons of soft ore for a fixed time period; and a second grinding line is capable of grinding through a ton of hard ore or grind through one and a half tons of soft ore for a fixed time period. As such, the first grinding line is more efficient on soft ores than the second grinding line, or the second grinding line is more efficient on hard ores. So a relative efficiency can be quantified between the two grinding lines. As such, in one example embodiment disclosed herein, blending flow configuration is generated based in part on grinding efficiency. In particular, optimizing the grinding process—and the material processing system—can be based on transporting hard ore or soft ore to the grinding line that is most efficient at grinding the corresponding ore. And, in another embodiment, blending flow configuration can be implemented based on maximizing mineral recovery in a downstream flotation process. As discussed in more detail below, the blending flow configuration can generally support blending a material using a transportation or a conveyance network to optimize the outcome of a downstream process (e.g., grind, gravity, separation, mineral extraction, etc.)

Moreover, conventional material processing systems are not configured with logic to avoid network node or link overload. For example, a material processing system that has a conveyor belt can be associated with an identified capacity threshold, which when exceeded will trigger shutting down processing of the material. Management of overflow in conventional mineral processing networks has mostly been performed manually or conservatively. For example, an operator may physically observe the flow of the ore and set overly cautious configurations for components of the mineral processing network. While this conservative approach minimizes risks of conveyor overflow, the blending process is not optimal. For example, a conventional mineral processing system does not adequately manage flow of the ore within the network links preceding merge points, while still achieving the pooling (or blending) objectives. In addition, operationally, having multiple sources that operate as on/off sources of the materials to be processed might become synchronized—so they are peaked at a given time when merging—that causes overload of the conveyor. As such, a more comprehensive material processing system—having an alternative basis for providing material processing system configurations and operations—can improve processing techniques provided using material processing systems.

Embodiments of the present disclosure are directed to providing a blending flow configuration for a material processing system that blends a material from multiple sources. A blending flow configuration identifies an arrangement of components and settings of the components in the material processing system to support blending a material (e.g., mineral).

Embodiments of the present disclosure are also directed to providing an overflow management configuration for a material processing system that blends a material from multiple sources. The overflow management configuration identifies an arrangement of components and settings of the components in the material processing system to support blending a material (e.g., mineral) while reducing a risk of overflow.

Figure 1B:
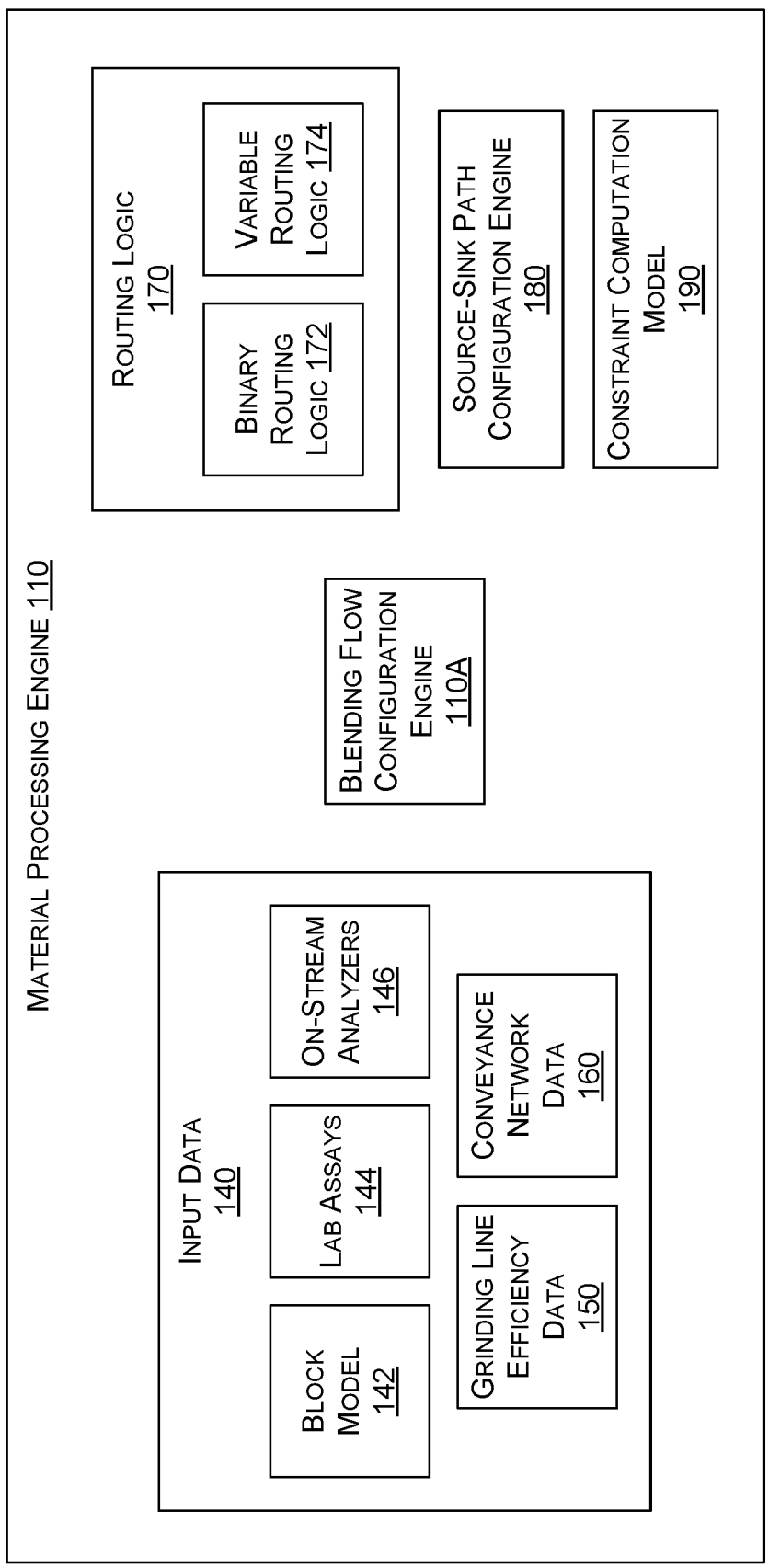
Figure 1C:
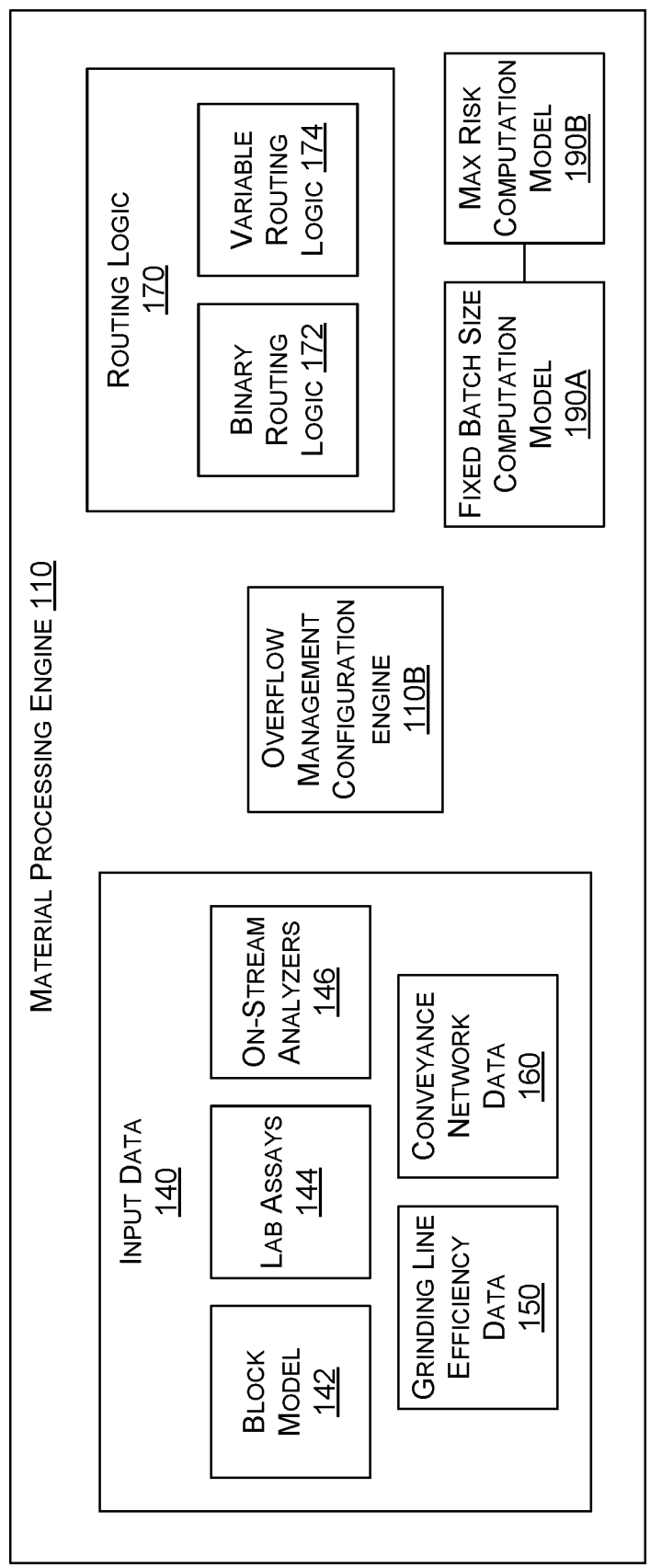

Aspects of the technical solution can be described by way of examples and with reference to FIGS. 1A, 1B, and 1C. FIG. 1A illustrates a material processing system 100 having a material processing engine 110, blending configuration engine 110A, overflow management configuration engine 110B, material processing engine client 110C, material processing engine interface 110D; pit 112, a plurality of hauling trucks (e.g., truck 114), a plurality of crushers (e.g., crusher 116) associated with corresponding sources 120 (e.g., source 1, source 2, source 3, source 4, and source 5); a conveyor network 180 having a first portion of the conveyor network 118A and a second portion of the conveyor network 118B, and a plurality of sinks 130 (e.g., sink 1, sink 2, sink 3, sink 4, and sink 5).

The material processing system 100 provides an operating environment for processing a material through the conveyor network 118 from the plurality of sources 120 to the plurality of sinks 130. The material processing system 100 can specifically support a mining operation for the extraction of valuable minerals or other geological materials from a pit (e.g., pit 112) transported for processing using trucks (e.g., truck 114). For example, ores recovered by mining include metals, coals, oil; however, mining in a wider sense can include extraction of different types of materials. The material processing system 100 includes the material processing engine 110 that supports hardware and software operations in mining operations. For example, the material processing engine 110 can help receive and communicate configurations and controller signals (e.g., conveyor network sensors—not shown) of the conveyor network to support transporting ores from sources to sinks. Other variations and combinations of material processing systems and physical manufacturing processes are contemplated with embodiments described herein.

The material processing engine 110 can include the blending flow configuration engine 110A and the overflow management engine 110B that provide blending flow configurations and overflow management configurations as described herein in more detail. The material processing engine 110 can operate with a material processing engine client 110C that is operationally coupled to a material processing engine interface 110D. The material processing engine client 110C can be a device that provides an interface for assisting (e.g., material processing system operators) with user interactions with the material processing engine 110 and other components of the material processing system 100. The material processing engine client 110C can also be part of a mining operations optimization platform that supports simulating flow network problems and generating configuration files (e.g., blending flow configuration files or overflow management configurations files) that can be used as input as settings and controls for components of the material processing system 100. Other variations and combination of material processing engines and materials processing engine clients for generating and implementing configurations associated with components a material processing system are contemplated with embodiment described herein.

With reference to FIGS. 1B and 1C, FIG. 1B illustrates the material processing engine 110 that includes input data 140 having block model 142, lab assays 144, on-stream analyzers 146, grinding line efficiency data 150, conveyance network data 160; blending flow configuration engine 110A; routing logic 170 including binary routing logic 172 and variable routing logic 174; source-sink path configuration engine 180, and constraint computation model 190. FIG. 1C illustrates the material processing engine 110 that includes input data 140 having block model 142, lab assays 144, on-stream analyzers 146, grinding line efficiency data 150, conveyance network data 160; overflow management configuration engine 110B; routing logic 170 including binary routing logic 172 and variable routing logic 174; fixed batch size computation model 190A and max risk computation model 190B.

By way of illustration, when a mine operation has multiple ores, such as two or more faces in one pit or multiple pits—and the mill the mine supplies has a diversity of grinding equipment—there exists an opportunity to increase mill throughput by routing differentiated ore to different grinding lines. If the ore is transported from a source to a destination on a conveyance network that enables combining ore from multiple sources, splitting ore to multiple destinations—or both—the conveyance network offers an opportunity to blend ore in such a way that the mill takes advantage of the relative capabilities of grinding equipment. The blending flow configuration engine 110A supports creating an optimal ore blend for the mill using the conveyance network to blend ore in real time. In particular, creating the optimal ore blend (i.e., solving the pooling or blending ratio problem) is based on routing from a source to a destination based on ore mineralogical properties and grinding line capabilities. Ore pooling (or blending ratio) can be based on an average flow of ore from sources to destination to achieve a desired blend for the grinding lines. Ore can typically be delivered in batches (e.g., truckloads) to the conveyance network. When combining ore from multiple uncoordinated sources on the same conveyance network, there exists a risk of overflow on some network nodes or links. The overflow management configuration engine 110B supports avoiding network node or link overload by managing the ore flow on links preceding merge points, while achieving the pooling objectives.

Figure 1D:
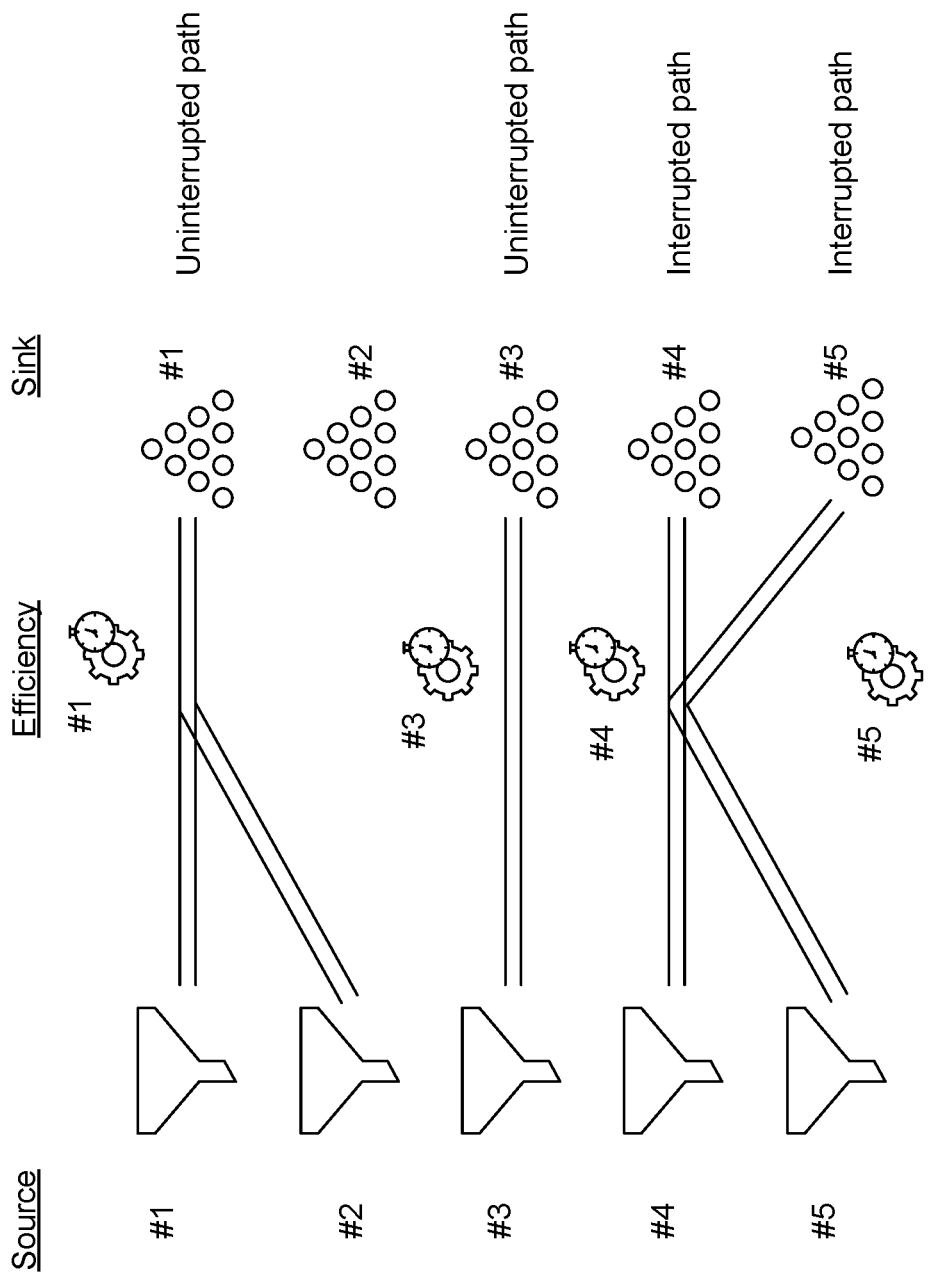

With reference to FIG. 1D, FIG. 1D illustrates aspects of the blending flow configuration engine 110A. FIG. 1D includes a plurality of sources (source 1, source 2, source 3, source 4, and source 5) and a plurality of sinks (sink 1, sink 2, sink 3, sink 4, and sink 5). Each source-sink path can be labeled as an uninterrupted path or an interrupted path. An uninterrupted path can refer to a source-sink path in which either of the following exist: no branching path; branching paths with fixed routing logic (not variable speed) and multiple destinations; and branching paths with variable routing logic and single (shared) destination. A path can refer to end-to-end sequence of arcs and nodes. A conveyer is a single arc. An interrupted source-sink path can refer to a source-sink path in which there are branching paths with multiple destinations. For example, two conveyers merge into one conveyer and then release into two or more different sink nodes. An interrupted source-sink path exists when the interrupting variable conveyer has variable set points and more than one destination. As such, by way of example, all ores that flow over this variable speed conveyer are interrupted and the interrupted source-sink path includes the interrupting variable conveyer.

As shown in FIG. 1D, source 1 and source 2 have an uninterrupted path to sink 1. Source 3 has an interrupted path to sink 4. Source 4 has an interrupted path to sink 4 and sink 5; and source 5 has an interrupted path to sink 4 and sink 5. It is contemplated that the ratio of flow from source 4 to sinks 4 and 5, respectively can be equal to the ratio of flow from source 5 to sinks 4 and 5, respectively. For example, if the ⅓ of the flow from source 4 goes to sink 4, it is possible for ⅓ of the flow from source 5 to also go to sink 4. The overall effect would be that sinks 4 and 5 receive the same blend of ore. Each sink (e.g., grinding lines) can be associated with a sink-node efficiency (e.g., efficiency 1, efficiency, 3, efficiency 4, and efficiency 5) at processing one or more mineralogical property (e.g., hardness) at each source node. For example, the efficiency can be measured as a throughput reduction for a one unit increase in each mineralogical property. In this way, as discussed in more detail herein, a linear algorithm can be used to assign material (e.g., ores) at each source sink to each sink, so as to maximize throughput according to the identified efficiency for a defined period of time. In the alternative, it is contemplated that a non-linear problem can be solved without the use of n discrete blending ratios. Advantageously, using discrete blending ratios is an additional step to make the solution procedure faster; however, a non-linear implementation can also be performed.

Figure 1E:
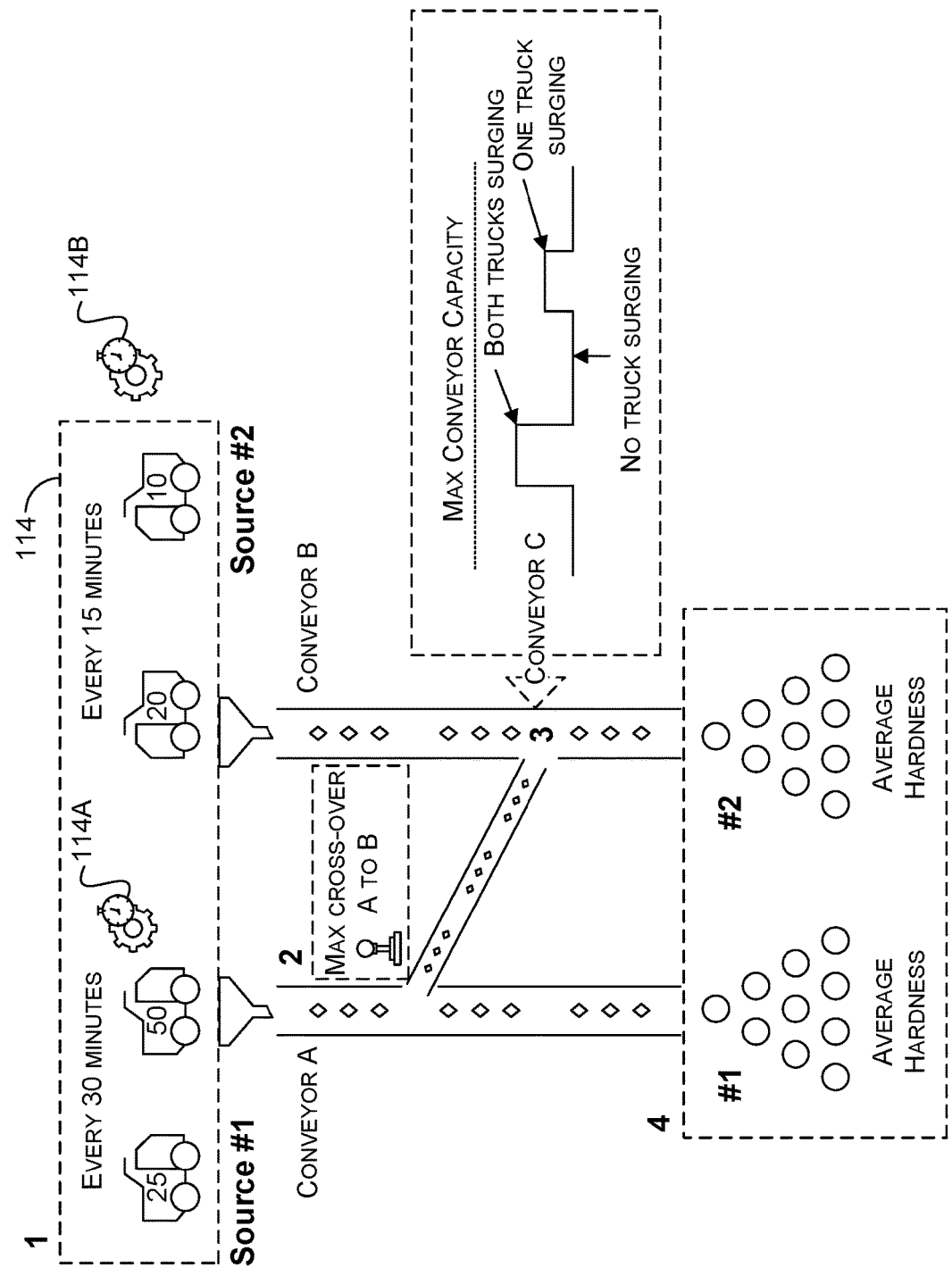

With reference to FIG. 1E, FIG. 1E illustrates aspects of the overflow configuration engine 110B. FIG. 1E includes node 1, node 2, node 3 and node 4. Node 1 includes a plurality of trucks 114 with inter-arrival times associated with corresponding sources (e.g., inter-arrival time 114A with source 1 and inter-arrival time 114B with source 2). FIG. 1E further includes conveyor network portions (e.g., conveyor A, conveyor B, and convey C); conveyor A and B are associated with a max cross-over A to B configuration that indicates a maximum amount of cross-over of materials of conveyor A to conveyor B; and sink 1 and sink 2 (i.e., stockpiles) having an expected pooling property of the mineral (e.g., average hardness). For example, a max set point can be set at node 2, so as to eliminate multi-truck surge to be lower than conveyer max capacity at node 3, while optimizing the hardness in each pile at node 4, given the hardness and inter-arrival time at node 1. In addition, a fixed batch size of either "surging" or "at rest" can be defined as a surging flow routing logic associated with a max conveyer capacity In this way, as discussed in more detail herein, for each active network edge (i.e., a conveyor with a non-zero flow in solution) the surge flow routing logic can be used to determine source nodes that pose risk, based on computing a max risk as the simultaneous surge at each "at risk source" for each active node. Operationally, computing a max risk can be based on an expected max flow value on any single conveyer assuming that all sources receive a maximum deposit of ore at one time. The surge flow routing logic can be used to determine the direction in which surge flow proceeds. So, for example if source 1 has a surge value of 1000 and then source 1 flows to conveyer 1 which is split by variable speed conveyer 2 onto conveyer 3 and conveyer 4, then the surge flow routing logic can be used to determine that all surge flow in excess of the variable speed conveyer set point flows onto conveyer 4 and not conveyer 3. If variable speed conveyer 2 is set to 700, then the 300 excess flow (1000-700) will proceed onto conveyer 4. If conveyer 4 already has an expected flow of 500 given the configuration of the entire conveyer system, then conveyer 4 max surge would be 500+300=800. The simplified example above is provided for illustrative purposes, and the logic can expand to include multiple sources, and multiple downstream conveyers so the summation includes more than just the two terms listed above.

Figure 2A:
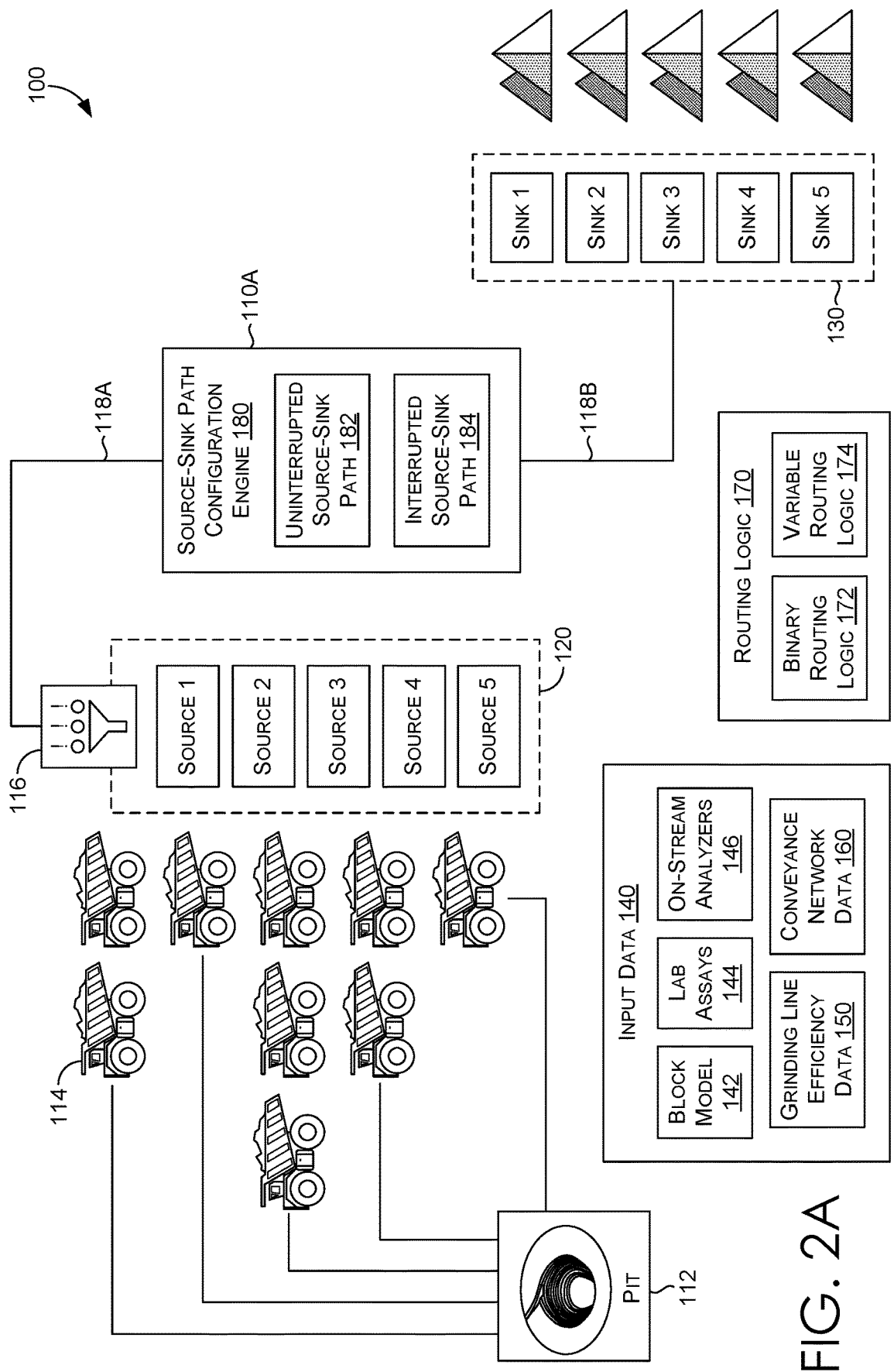
FIG. 2A is a block diagram of an exemplary material processing system with a blending flow configuration engine, in which embodiments described herein may be employed.
Figure 2B:
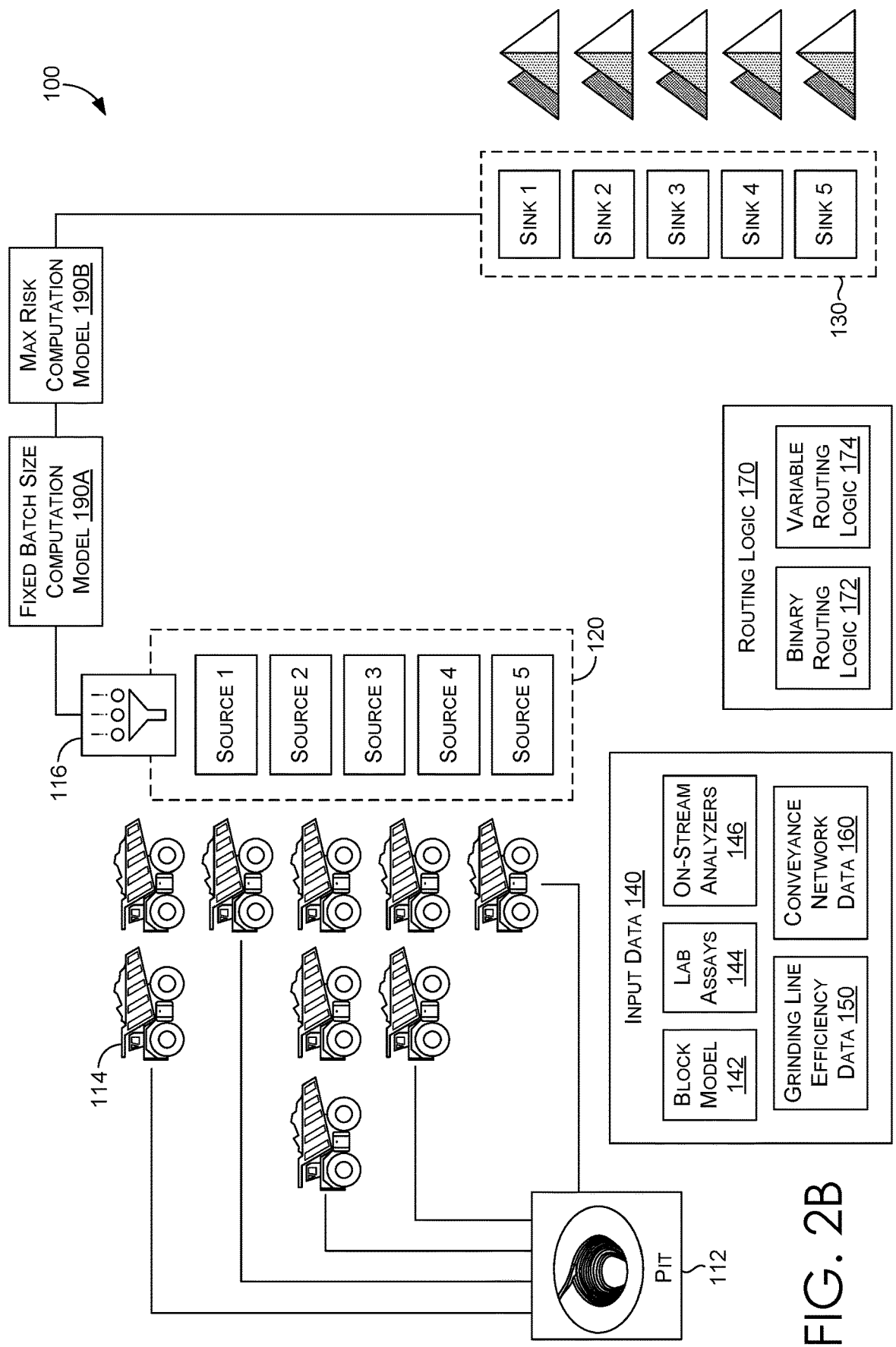
FIG. 2B is a block diagram of an exemplary material processing system with an overflow management configuration engine, in which embodiments described herein may be employed.

Aspects of the technical solution can be described by way of examples and with reference to FIGS. 2A and 2B. FIG. 2A is a block diagram of an exemplary technical solution environment, based on example environments described with reference to FIGS. 6 and 7 for use in implementing embodiments of the technical solution are shown. Generally the technical solution environment includes a technical solution system suitable for providing the example material processing system 100 in which methods of the present disclosure may be employed. In particular, FIG. 2A shows a high level architecture of the material processing system 100 in accordance with implementations of the present disclosure. Among other engines, managers, generators, selectors, or components not shown (collectively referred to herein as "components"), the technical solution environment of material processing system 100 corresponds to FIG. 1A and further includes blending flow configuration engine 110A (not shown) that includes input data 140—including block model 142, lab assays 144, on-stream analyzers 146, grinding line efficiency data 150, conveyance network data 160, routing logic 170 including binary routing logic and variable routing logic; source-sink path configuration 180 including uninterrupted source-sink path and interrupted source-sink path 184.

At a high level, material properties of a material (e.g., ore hardness and softness) and relative grinding efficiency of grinding lines (i.e., grinding line efficiency data) can be used to route and blend the material on a fixed transport network (e.g., a conveyance network of a material processing system) to maximize throughput. The blending flow configuration engine (e.g., blending flow configuration engine 110A of FIG. 1B) can generate a configuration based on a logic or algorithm that supports assigning the material with certain material properties (e.g., ore with mineralogical properties) to stockpiles with a variable speed conveyance networks using a linear blending strategy to optimize the outcomes of different downstream processes.

In operation, the blending flow configuration engine can receive several inputs (e.g., input data 150). For example, input data can include a block model that is representative of a geological investigation associated with a mining operation for a mineral. The block model can be a three-dimensional grid with labeled blocks or cubes associated with analyzed core samples that are representative of compositional data of the mineral. The block model can be used to create an access path and inform how to mine out the mineral.

Input data can further include lab assays that represent the results of lab analysis of the samples. The lab assays can be for chemical composition analysis performed on the samples associated with the block model. Samples may also be for material that is retrieved from the conveyor belt. An on-stream analyzer can refer to an X-ray device that supports analyzing the mineral. For example, the on-stream analyzer can include a transmitter that is mounted on a shovel. An on-stream analyzer can communicate a sensor signal and receive a reflection of a spectrum associated with mineral. The on-stream analyzer analyzes the spectrum to determine the composition of the chemical materials of the mineral. The on-stream analyzer can be used at any time in the mineral processing.

The blending flow configuration engine 110A is based on a network flow rate, average properties of the network flows for one or more network flow properties, variable speed of the network flow. In particular, the variable speed of the network flow is associated with a plurality of nodes that are configurable to split the flow in a variable degree. For example, a mining process for ores may be based on the material processing system 100 that supports on-conveyor blending with nodes that vary the speed of the network flow as part of blending the ores. As such, the average properties of flow through a node is no longer maintained because it can be configured in a variable fashion—such as 80% in a first direction and 20% in a direction—changing the network flow rate for any connected downstream flow.

As blending occurs throughout the network flow, a final average property of the network flow will eventually differ from the average property of the network flow at the beginning. The blending flow configuration engine has to address a non-linear problem because of the variable speeds associated with the network flow. Moreover, there exists a requirement to track the average properties of one or more network properties. The blending flow configuration engine can operate based on keeping a solution to a non-linear problem linear in its implementation to assist operators in understanding and implementing appropriate network flow optimization configurations.

Specifically with reference to pooling, a pooling problem describes a situation in which products possessing different attributes or qualities are mixed in a series of pools in such a way that the quality of the blended products of the end pools satisfy given requirements. Pools of a particular mineral (e.g., ore) is based on average flow of the mineral from sources to destinations to achieve the desired blend for the grinding lines. For example, ore can be delivered in batches to a mineral processing network (e.g., a conveyance network), where the ore is combined from multiple sources from the same network. There exists risk of overflow on some network nodes or links.

In operation, during pooling, a first rate—at which a first batch of a material with a first set of properties—is received from a first source, is determined; and a second rate—at which a second batch of the material with a second set of properties—is received from a second source, is determined. A mix of ratios—of the first batch of the material and a second batch of the materials—can be performed to create a blend of the material that is optimal for grinding lines at sinks operating as demand points. For example, ores can be associated with a hardness property, where the hardness determines an amount of time that is required to grind the ores. Moreover, grinding lines can operate at different relative capabilities that are a function of grinding hard ores and soft ores. As such, there exist different trade-offs that are associated with different allocations of the ores to grinding lines. Blending with ratios provides more flexibility instead of blending with absolute proportions.

Accordingly, the blending flow configuration engine can be associated with a known property of a material and known performance capability of demand points that are used to create a ratio-based blend of the material to drive the highest throughput at demand points. For example, Mohs hardness scale can be used as a property (e.g., hardness or softness) of ores to create a blend of the different types of ores to improve throughput across a combination of grinding lines that have relative capabilities of grinding hard ores and soft ores. Ores can be taken from a crusher in a directed manner to stockpiles while being blended as the ore flows along. The use of ores is not meant to be limiting to the scope of the implementation of the embodiments described herein. The optimization logic can be applied to a network flow configuration of different types of materials.

Another input into the blending flow configuration engine is grinding line performance data or grinding operation data (i.e., grinding line efficiency data 150) that estimates grinding line performance for each line. Performance data can be related to the performance of the grinding lines for grinding through ores including without limitation test and real-time data. Performance includes usability feedback data generated during the use of the grinding lines or predefined grinding line performance data. Performance data further includes data gathered material processing that relates to the performance or outcome of grinding lines. As such, multiple techniques exist for determining a grinding line efficiency. For example, ore tracking system tracks ore through to the end of grinding lines, such, that, grinding line efficiency can be measured as throughput rate per tons per hour. Other variations and combinations of grinding line performance data are contemplated with embodiments described herein.

In operation, by way of example with reference to mining ores, blending flow configuration engine is configured to identify source nodes where haulage deposits ore onto conveyer network; identify sink nodes where conveyers deposit ore into stockpiles; identify transhipment nodes and network arcs (conveyers); and identify routing logic between each network edge (between conveyers) as binary or variable. The blending flow configuration engine is further configured to access an estimate of sink node's (stockpile)—grinding line—efficiency at processing each mineralogical property measured at each source node. For example, the grinding line efficiency can be measured as a throughput reduction for a one unit increase in each mineralogical property.

The blending flow configuration engine is further configured to label each network arc as belonging to an uninterrupted source-sink path or an interrupted source-sink path. The uninterrupted source-sink path can be defined as any source-sink path in which there is either: no branching paths; branching paths with fixed routing logic (not variable speed) and multiple destinations; branching paths with variable routing logic and a single (shared) destination. An "interrupted source-sink path" is defined as any source-sink path in which there are branching paths with multiple destinations (two conveyers merge onto one conveyer and then go to two or more different sink nodes)

For each interrupted source-sink path, the blending flow configuration engine is configured to identify all source-sink paths that flow through the interrupting variable conveyer and perform the following: choose n possible blending ratios for the interrupting variable conveyer; constrain all source-sink paths that flow through the "interrupting variable conveyer" to be blended using the same blending ratio of source ore; and constrain the conveyer network to adhere to the associated variable speed routing logic.

Choosing n possible blending ratios supports generating a linearization problem. In particular, interrupted source-sink paths become non-linear optimization problems because an expected sink flow can be computed by using a mathematical expression that multiplies two decision variables together. For example, assume conveyer 1 proceeds to conveyer 2 which is variable speed which then deposits ore into sinks 1 and 2, a determination of how much flow should be allocated to conveyer 1 and what the variable speed should be for conveyer 2 has to be made. In order to compute the expected flow onto sink 1 the computation includes: conveyer 1 flow*(variable speed percentage set point to sink 1)=total flow to sink 1. This term multiplies two decision variables and so is not linear. By choosing n possible blending ratios, a substitution of the variable speed percentage set point decision variable can be made with a constant value and then solving for conveyer 1 flow. It is contemplated that multiple blending ratios are attempted because it is unlikely to guess the optimal variable speed percentage set point to use for that substitution. And, constraining the network, constrains the conveyer network to include one of the n possible blending ratios in the final optimal answer. The constraint can be applied to one source-sink path, while making changing to achieve an optimal configured for the rest of the system.

The blending flow configuration engine is further configured to constrain the conveyer network to adhere to the fixed and variable routing logic associated with uninterrupted source-sink paths. And given existing constraints in the conveyance network, the blending flow configuration engine is configured use a linear algorithm to assign an amount of material at each source to each sink so as to maximize throughput. The amount of material can be specifically defined for a single time period. When provided n discrete choices of blending ratios, a non-linearity in the decision problem is removed. The resulting formulation is linear and can be solved with a standard LP (linear program) solver.

FIG. 2B is a block diagram of an exemplary technical solution environment, based on example environments described with reference to FIGS. 6 and 7 for use in implementing embodiments of the technical solution are shown. Generally the technical solution environment includes a technical solution system suitable for providing the example material processing system 100 in which methods of the present disclosure may be employed. In particular, FIG. 2B shows a high level architecture of the material processing system 100 in accordance with implementations of the present disclosure. Among other engines, managers, generators, selectors, or components not shown (collectively referred to herein as "components"), the technical solution environment of material processing system 100 corresponds to FIG. 1A and further includes overflow management configuration engine 110B (not shown) that includes input data 140—including block model 142, lab assays 144, on-stream analyzers 146, grinding line efficiency data 150, conveyance network data 160, routing logic 170 including binary routing logic and variable routing logic; source-sink path configuration 180 including fixed batch size computation model 190A and max risk computation model.

The material processing system 100 includes two or more sources and two or more sinks. For example, for ore processing, the two sources can have corresponding crushers and the two sinks have corresponding stockpiles. In particular, haul trucks are associated with inter-arrival times (e.g., inter-arrival times 114B and 114B of FIG. 1C). A haul can be associated with a substantially fixed volume of the material. For example, the fixed volume can be based on the size of the truck. Substantially fixed volume is used here to note that the fixed volume could be a little bit more or little bit less, but on average assume a fixed volume of the ore based on the size of the truck.

By way of context, conventionally, based on the number of trucks and their capacity, an average flow of the material through the material processing system 100 can be determined. The material from the haul trucks can be released at the same time into the material processing system and be worked through the material processing system; however the material is throttled based on a predefined max capacity. In this way, only the predefined capacity would be unloaded into the material processing system. And, conventionally, the material would be transported to a single conveyor and no mixing is performed as it would increase the risk of overloading the material processing system. In the conventional case, a batch can be dropped every 30 minutes, such that, the batch is conveyed from the source to a corresponding sink. The loading of the material can be throttled based on the inter-arrival time.

The one source to one sink configuration conservatively limits the amount of volume that can be placed onto a conveyor. In this away, a conventional material processing system is limited in the amount of volume that can be processed and the configuration only supports one source to one sink. In addition, conventionally, the decision on where to send the ore is based only on the amount of material at the end node. So, while the material processing system may include a crossover, the crossover is used when an amount of material in a pile is low (e.g., crossover can be used to—turn off delivery at a first source and drop all material at a second source).

The blending flow configuration engine, as discussed earlier, addresses the problem of getting the right material to the right pile. A blending flow configuration (e.g., a blending algorithm) supports pairing the selected material (e.g., based on material properties) with the right sink given the implications of the downstream performance. Lab assays help identify the mineralogical properties (e.g., hardness) and the types of minerals in the block such that the batches of the material are systematically chosen and directed to certain piles in order to achieve a consistent product—a pile that has a very similar hardness. Depending on the performance of the downstream components (e.g., grinding lines) the material processing system can operate to send batches having certain mineralogical properties to different piles. Different machinery downstream from that pile will be better at processing the materials. Conventionally, the primary concern is whether there exists enough volume of the materials for continued processing via the material processing system. Conventionally, there existed no concern whether the right type of materials to efficiently align with the downstream process (e.g., maximizing performance of the downstream process).

Overflow management mitigates the risk of overflow in a material processing system that supports blending, without conservatively sending one source to one sink based on the size of the stockpile. Delivery and blending on the material processing system 100 is based on both the stockpile height and the right blend associated with the mineralogical properties of the material—via on-conveyor blending. In contrast, convergence points are avoided in conventional material processing systems. Convergence points increase the risk of overflow. The overflow management configuration engine enables implementing a crossover with two or more sources, while limiting the potential of overflowing.

Mathematical speaking the sources are binary—that is on/off—and not a continuous process and conveyor capacity at different nodes can be indicated. By way of illustration— via an ore mining system—three different delivery types are possible: no truck is delivering ore; one truck delivering ore (surging); or both trucks delivering ore. The more sources that exist, the higher the risk of overflow based on surges. The overflow management configuration engine operates based on a mathematical formulation that allows for blending given the knowledge of inter-arrival times and a mathematical representation of surges that prevents the scenario of exceeding the max conveyor line.

By way of context, operationally, the grinding lines are the bottleneck in a material processing system. The material processing system 100 supports material pooling (blending with ratios) supports on average flow of the material from sources to destinations to achieve the desired blend for the grinding lines. For example, the material can be ores that are typically delivered in batches (truckloads) to the routing network. The better the blending flow configuration, the better the bottleneck resource becomes to maximize the speed of the conveyor, optimized for the destination, while managing the risk of overflow. In other words, two trucks with materials having properties (e.g., hardness) the material processing system 100 operates to provide the right hardness of materials to the right pile.

Given inter-arrival time at a source, the overflow management configuration engine mathematically determines a max amount that can be crossed over from a first conveyor to a second conveyor without creating risk of overflow convergence. When combining ore from multiple, uncoordinated sources onto the same network, there is a risk of overflow on some network nodes or links. The overflow management configuration engine is configured to support avoiding network node or link overload by managing material flow on links preceding merge points while still achieving the pooling objectives. In particular, the overflow management configuration engine generates an overflow management configuration based on a sequence of steps, where the overflow management configuration minimizes conveyer overflow risk due to inconsistent haulage rates, while meeting stockpile height requirements.

The overflow management configuration engine can receive several inputs (e.g., input data 150). For example, input data can include a block model that is representative of a geological investigation associated with a mining operation for a mineral. The block model can be a three-dimensional grid with labeled blocks or cubes associated with analyzed core samples that are representative of compositional data of the mineral. The block model can be used to create an access path and inform how to mine out the ore.

Input data can further include lab assays that represent the results of lab analysis of the samples. The lab assays can be for chemical composition analysis performed on the samples associated with the block model. Samples may also be for material that is retrieved from the conveyor belt. An on-stream analyzer can refer to an X-ray device that supports analyzing the mineral. For example, the on-stream analyzer can include a transmitter that is mounted on a shovel. An on-stream analyzer can communicate a sensor signal and receive a reflection of a spectrum associated with mineral. The on-stream analyzer analyzes the spectrum to determine the composition of the chemical materials of the mineral. The on-stream analyzer can be used at any time in the mineral processing.

Another input into the overflow management configuration 110B is grinding line performance data or grinding operation data (i.e., grinding line efficiency data 150) that estimates grinding line performance for each line. Performance data can relate to the performance of the grinding lines for grinding through ores including without limitation test and real-time data. Performance includes usability feedback data generated during the use of the grinding lines or predefined grinding line performance data. Performance data further includes data gathered material processing that relates to the performance or outcome of grinding lines. As such, multiple techniques exist for determining a grinding line efficiency. For example, ore tracking system tracks ore through to the end of grinding lines, such, that, grinding line efficiency can be measured as throughput rate per tons per hour. Other variations and combinations of grinding line performance data is contemplated with embodiments described herein.

By way of example, with reference to mining ores, overflow management configuration engine is configured to identify source nodes where haulage deposits ore onto conveyer network; identify sink nodes where conveyers deposit ore into stockpiles; and identify transhipment nodes and network arcs (conveyers); and identify routing logic between each network edge (between conveyers) as binary or variable. The overflow management configuration engine 110B is further configured to access an estimate of sink node's (stockpile)—grinding line—efficiency at processing each mineralogical property measured at each source node. For example, the grinding line efficiency can be measured as a throughput reduction for a one unit increase in each mineralogical property.

The overflow management configuration engine can further identify a routing logic between each network edge (between conveyers) as binary or variable. And, given the routing logic, identify the surge flow routing logic in that: if a binary routing edge: surge only flows in the direction that ore is flowing (where the binary switch is pointing); and if variable routing edge the overflow management configuration engine is configured to identify binary direction in which surge flows (depending on conveyer mechanics) and all surge risk depending on active conveyer pattern in excess of variable set point flows in binary direction. In other words, when conveyor settings (on/off, which direction, and the split ratio) are chosen, a determination of all of the possible material flows in the network has been made. This is a network routing scenario and additional operation can be performed to analyze the surge risk given the scenario.

The overflow management configuration further includes a fixed batch size computation model 190A that formalizes material delivery. For example, ore delivery can be formalized into fixed batches of haul truck size that are either "surging" or "at rest". At rest indicates 0 flow, surging indicates flow corresponding to the fixed haul truck size. Average flows are then average total tonnage for a given time period across off haul surges.

The fixed batch size configuration model 190A is configured to compute an expected material (e.g., ore) value based on:

fixed_haul_source_1*(source_1_pct_surge-source_2_pct_surge . . . -source_i_pct_surge)#source 1 surges alone+fixed_haul_source_2*(source_2_pct_surge-source_1_pct_surge . . . -source_i_pct_surge) #source 2 surges alone+(fixed_haul_source_1+fixed_haul_source_2)* (source_1_pct_surge*source_2_pct_surge . . . - source_i_pct_surge) #source 1 and 2 surge together+ . . . source_i_i+_1_surge_together*pct_source_i_i_+_1_and_ nothing_else_surge together+(fixed_haul_all_sources)*pct_all_surge_together) #everything surges at once.

Simply put, the function above corresponds to an expected value calculation associated with (1) a discrete number of possible outcomes; and (2) an ore flow associated with each outcome. Operationally, each outcome occurs with a probability p (or relative frequency in %). The expected value is (probability of an outcome*ore flow under this outcome) summed over all possible outcomes.

The overflow management configuration 110B further includes max risk computation model 190B. The max risk computation model 190 is configured to: for each active network edge (conveyer with non-zero flow in solution) use surge flow routing logic to determine source nodes that pose risk and compute max risk as the simultaneous surge of each "at risk source" for each active node. The overflow management configuration engine is further configured to constrain solution such that no node has a max risk exceeding its capacity and constrain the expected value flows computed to meet the stockpile height requirements.

Figure 2C:
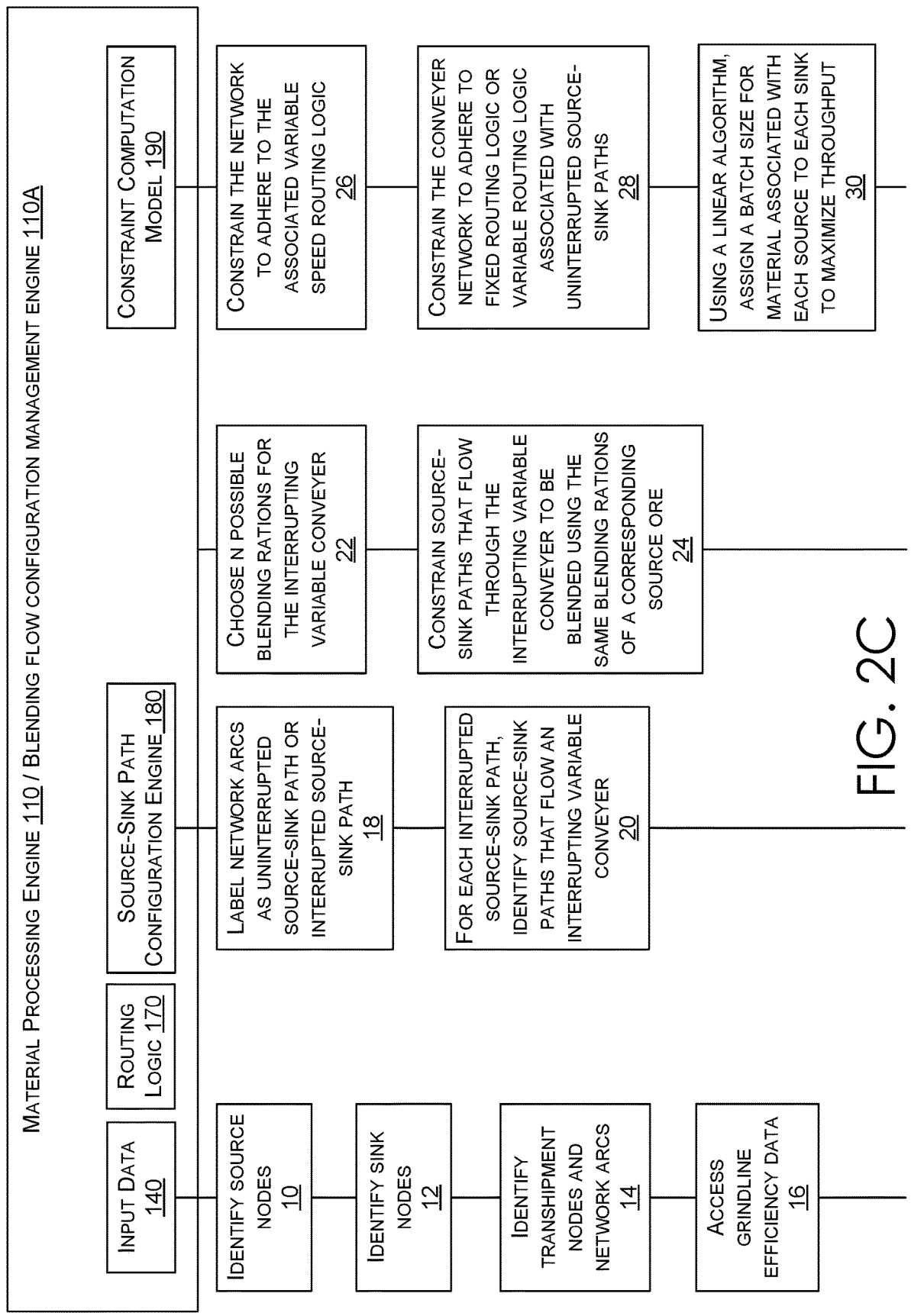
FIG. 2C is a schematic associated with an exemplary material processing system with a blending flow configuration engine, in which embodiments described herein may be employed.

With reference to FIG. 2C, FIG. 2C illustrates material processing engine 110, blending flow configuration management engine 110A, input data 140, routing logic 170, source-sink path configuration engine 180, and constraint computation model 190. At block 10, source nodes—where haulage deposit ore onto a conveyor network—are identified. At block 12, sink node—where conveyers deposit ore into stockpiles—are identified. At block 14, transshipment nodes and network arc—conveyers—are identified. At block 16, grindline efficiency data is accessed. For example, grindline efficiency data can include an estimation of each sink node's efficiency at processing mineralogical property measured at each source, measured as a throughput reduction for a one unit increase in each mineralogical property.

At block 18, network arcs are labeled as uninterrupted source-sink paths or interrupted source-sink paths. At block 20, for each interrupted source-sink path, source-sink paths that flow through the interrupted source-sink path (i.e., interrupting variable conveyer) are identified. At block 22, "n" possible blending ratios for the interrupting variable conveyer are chosen. At block 24, source-sink paths that flow through the interrupting variable conveyer are constrained to be blended using the same blending ratio of a source ore. At block 26, the conveyor network is constrained to adhere to the associated variable speed routing logic. At block 28, the conveyor network is constrained to adhere to the fixed and variable routing logic associated with uninterrupted source-sink paths. At block 30, using a linear algorithm, a batch size for material associated with each source to each sink is assigned to maximize throughput.

Figure 2D:
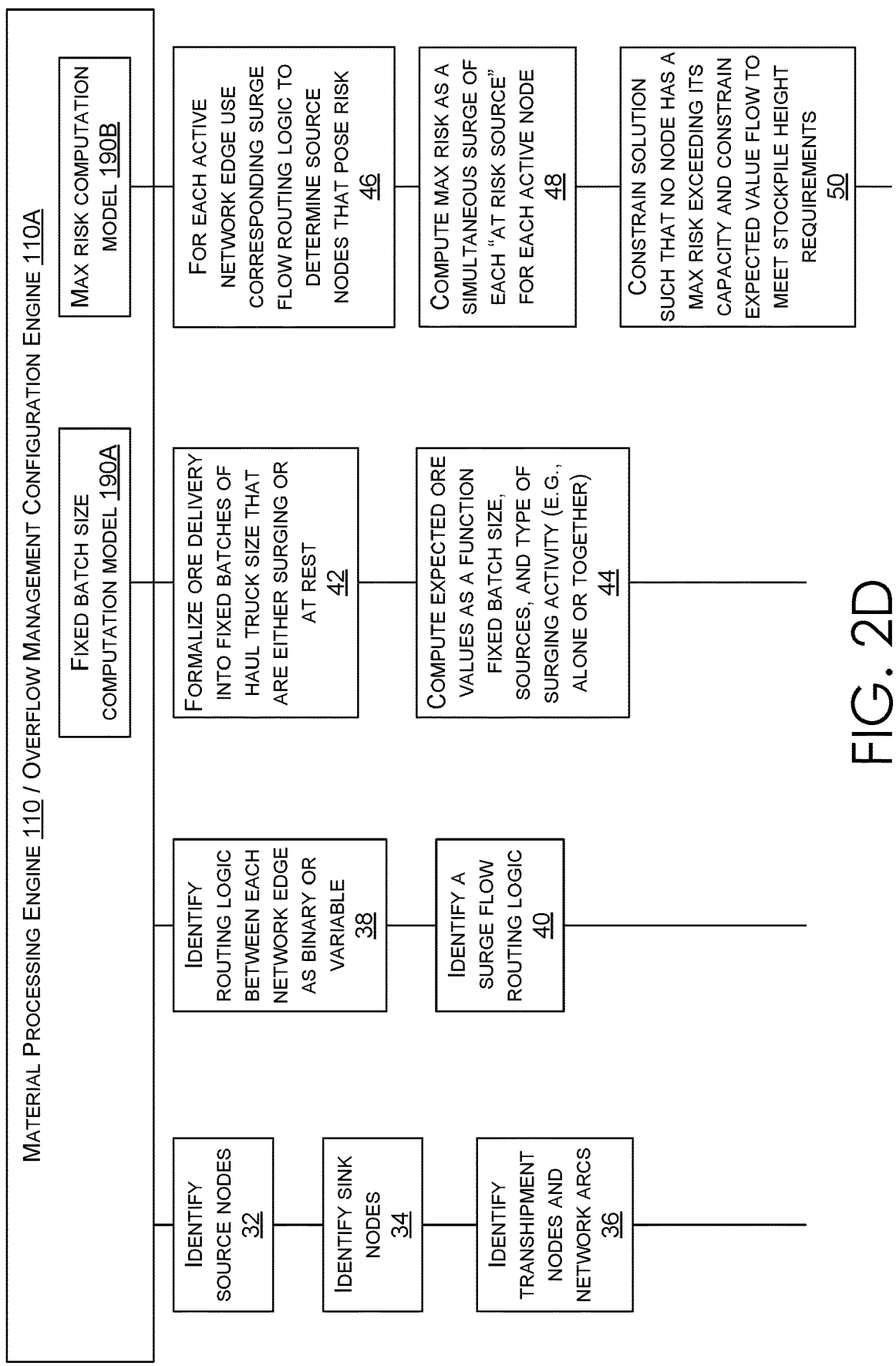
FIG. 2D is a schematic associated with an exemplary material processing system with an overflow management configuration engine, in which embodiments described herein may be employed.

With reference to FIG. 2D, FIG. 2D illustrates material processing engine 110, overflow management configuration management engine 110A, fixed batch size computation model 190A, and max risk computation model 190B. At block 32, source nodes—where haulage deposit ore onto a conveyor network—are identified. At block 34, sink node—where conveyers deposit ore into stockpiles—are identified. At block 36, transshipment nodes and network arc—conveyers—are identified. At block 38, routing logic between each network edge is identified as binary or variable. At block 40, based on the routing logic at block 38, a surge flow routing logic is identified. If a network edge has a binary routing logic, the surge only flows in the direction that the ore is flowing (i.e., where the binary switching is pointing) and if a network edge has variable routing, a binary direction in which a surge flows (i.e., depending on conveyer mechanics) is identified; and surge risk depends on active conveyer patterns in excess of variable set point flows in binary direction.

At block 42, ore delivery into fixed batches of haul truck size that are either "surging" or "at rest" are formalized. At rest indicates 0 flow, surging indicates flow corresponding to the fixed haul truck size. Average flows are then average total tonnage for a given time period across all haul surges. At block 44, expected ore values are computed as a function of fixed haul size, sources, surging alone or surging together. At block 46, for each active network edge (i.e., conveyer with non-zero flow in solution) use surge flow routing logic—from block 38—to determine source nodes that pose risk. At block 48, compute max risk as the simultaneous surge of each "at risk source" for each active node. At block 50, the solution is constrained such that no node has a max risk exceeding its capacity; and constrained such that the expected value flows meet the stockpile height requirements.

Exemplary Methods

Figure 3:
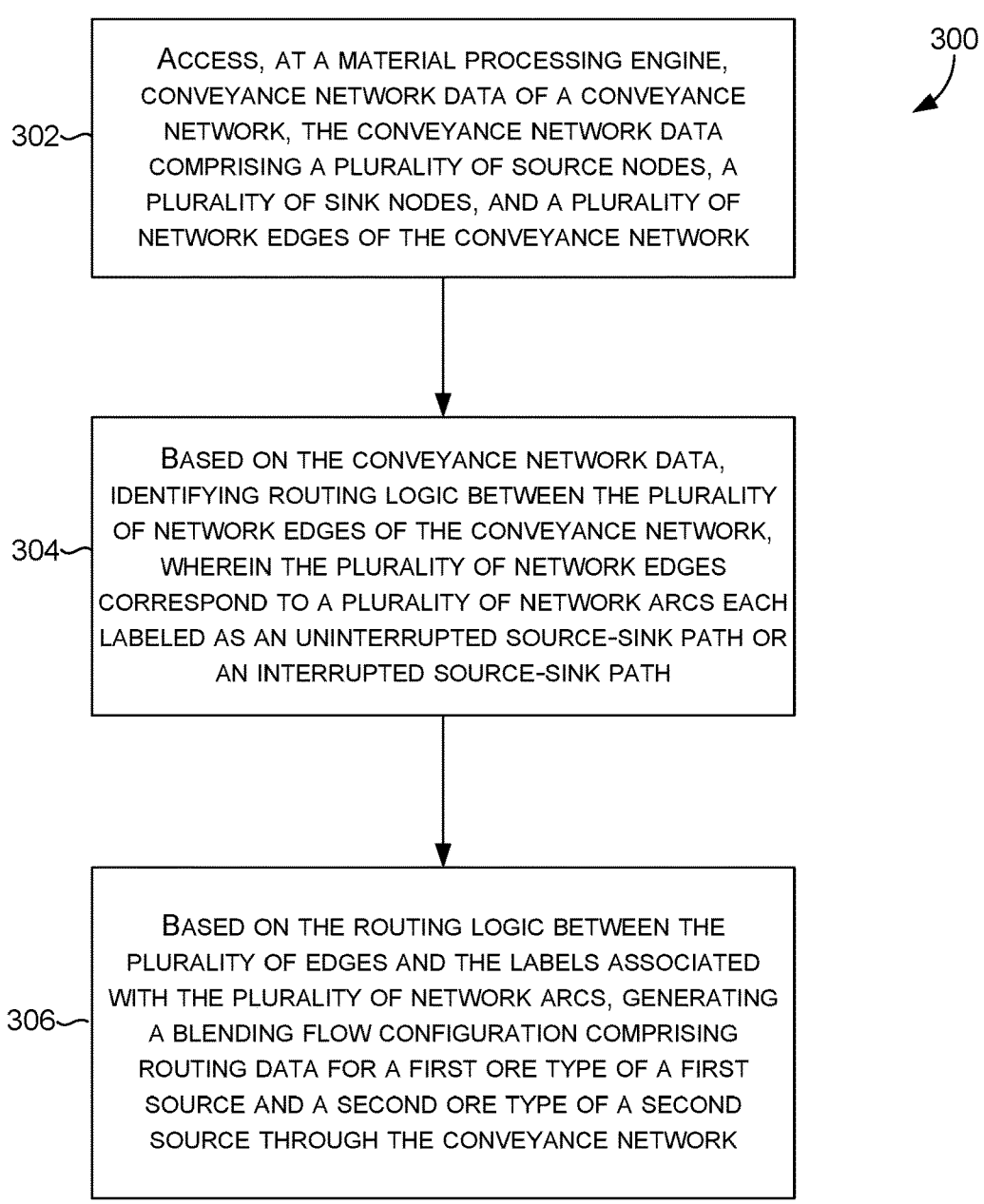
FIG. 3 is a flow diagram showing an exemplary method for implementing a material processing system with a blending flow configuration engine, in accordance with embodiments described herein.
Figure 4:
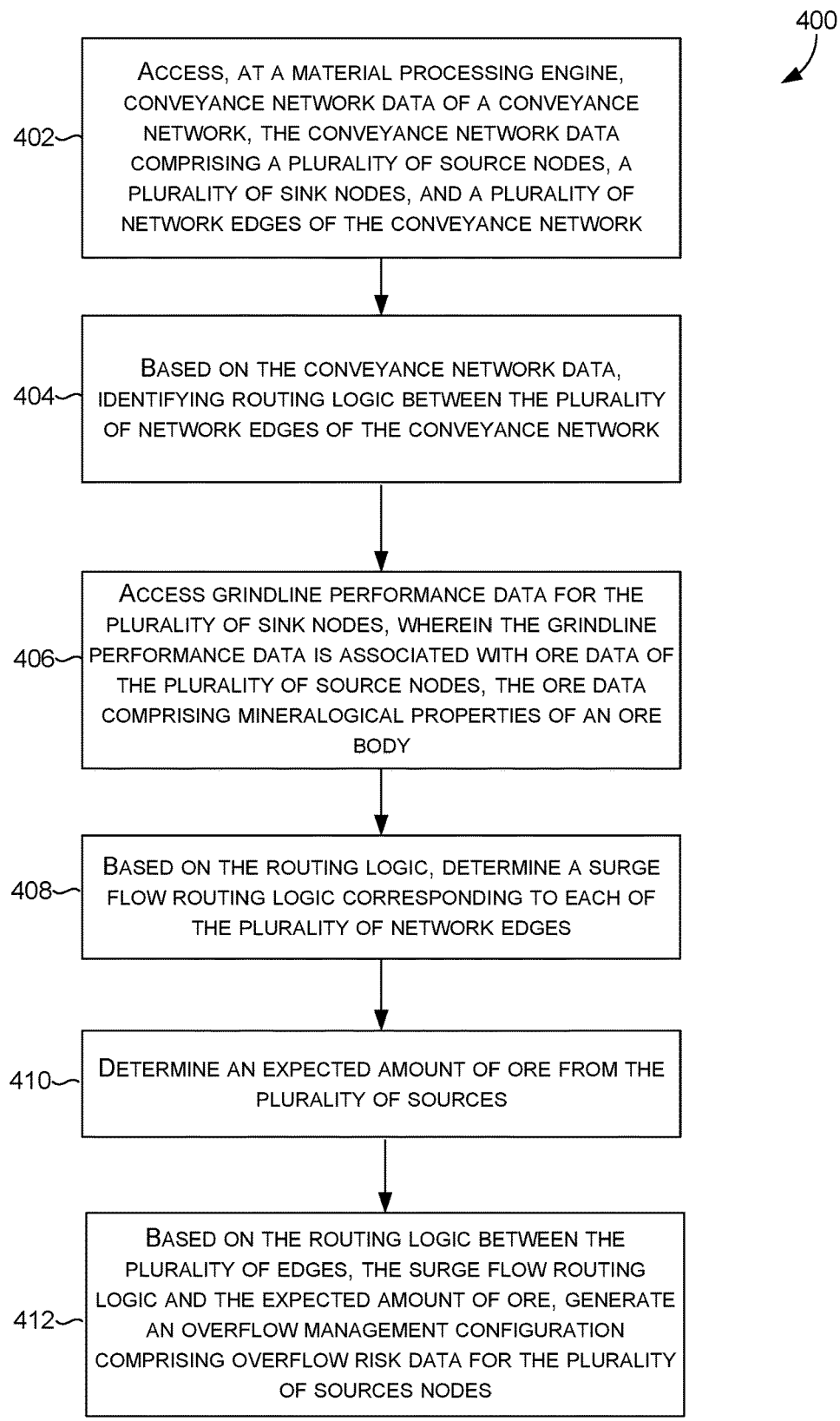
FIG. 4 is a flow diagram showing an exemplary method for implementing a material processing system with an overflow management configuration engine, in accordance with embodiments described herein.
Figure 5:
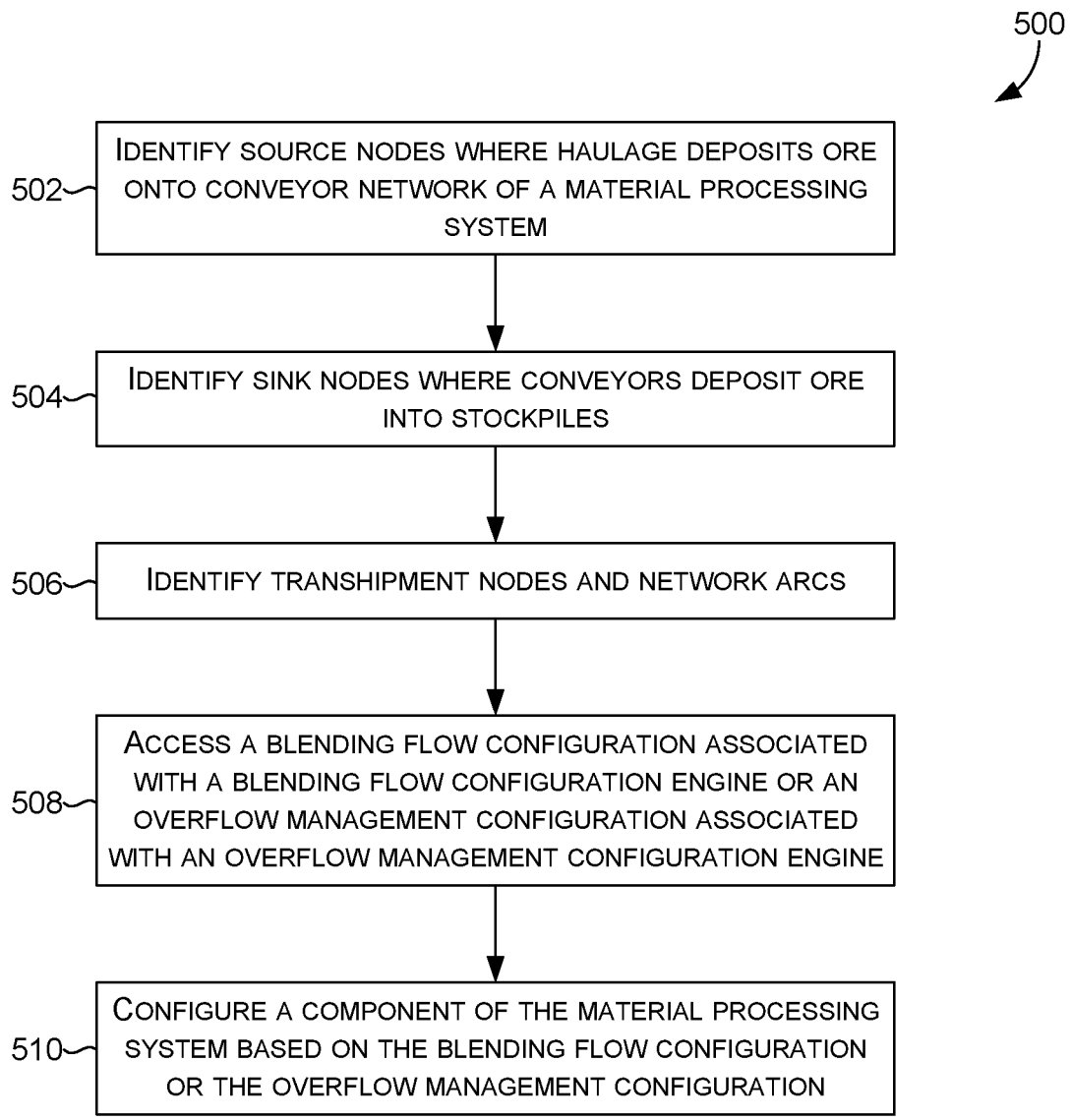
FIG. 5 is a flow diagram showing exemplary method for implementing a material processing system, in accordance with embodiments described herein.

With reference to FIGS. 3, 4 and 5, flow diagrams are provided illustrating methods for providing a blending flow configuration for a material processing system that blends a material from multiple sources or generating an overflow management configuration for a material processing system that blends a material from multiple sources. The methods may be performed using the material processing system described herein. In embodiments, one or more computer-storage media having computer-executable or computer-useable instructions embodied thereon that, when executed, by one or more processors can cause the one or more processors to perform the methods (e.g., computer-implemented method) in the material processing system (e.g., a computerized system or computing system).

Turning to FIG. 3, a flow diagram is provided that illustrates a method 300 for providing a blending flow configuration for a material processing system. At block 302, conveyance network data of a conveyance network is accessed at a material processing engine. The conveyance network data comprises a plurality of source nodes, a plurality of sink nodes, and a plurality of network edges of the conveyance network. At block 304, based on the conveyance network data, routing logic between the plurality of network edges of the conveyance network are identified. The plurality of network edges correspond to a plurality of network arcs each labeled as an uninterrupted source-sink path or an interrupted source-sink path. At block 306, based the routing logic between the plurality of edges and the labels associated with the plurality of network arcs, a blending flow configuration comprising routing data for a first ore type of a first source and a second ore type of a second source through the conveyance network is generated.

Turning to FIG. 4, a flow diagram is provided that illustrates a method 400 for providing a blending flow configuration for a material processing system. At block 402, conveyance network data of a conveyance network is accessed at a material processing engine. The conveyance network data comprises a plurality of source nodes, a plurality of sink nodes, and a plurality of network edges of the conveyance network. At block 404, based on the conveyance network data, routing logic between the plurality of network edges of the conveyance network are identified. At block 406, grindline performance data for a plurality of sink nodes is accessed. The performance data is associated with ore data of the plurality of source nodes, the ore data comprising mineralogical properties of an ore body. At block 408, based on the routing logic, a determination is made of surge flow routing logic corresponding to each of the plurality of network edges. At block 410, a determination is made of an expected amount of ore from the plurality of sources. At block 412, based on the routing logic between the plurality of edges, the surge flow routing logic and the expected amount of ore, an overflow management configuration comprising overflow risk data for the plurality of source nodes is generated.

Turning to FIG. 5, a flow diagram is provided that illustrates a method 500 for configuring a component of a material processing system based on a blending flow configuration or an overflow management configuration. At block 502, source nodes where haulage deposits ore onto a conveyor network of a material processing system are identified. At block 504, sink nodes where conveyors deposit ore into stockpiles are identified. At block 506, transshipment nodes and network arcs are identified. At block 508, a blending configuration associated with a blending configuration engine or an overflow management configuration associated with an overflow management configuration engine are accessed. At block 510, a component of the material processing system is configured based on the blending flow configuration or the overflow management configuration.

Blending Flow Configuration—Embodiments

Embodiments described are directed to providing a blending flow configuration for a material processing system. Operationally, the method includes accessing, at a material processing engine, conveyance network data of a conveyance network, the conveyance network data comprising a plurality of source nodes, a plurality of sink nodes, and a plurality of network edges of the conveyance network, wherein the conveyance network combines at least two source nodes of the plurality of source nodes to one sink node of the plurality of sink nodes; based on the conveyance network data, identifying routing logic between the plurality of network edges of the conveyance network, wherein the plurality of network edges correspond to a plurality of network arcs each labeled as an uninterrupted source-sink path or an interrupted source-sink path; and based on the routing logic between the plurality edges and the labels associated with the plurality of network arcs, generating a blending flow configuration comprising routing data for a first ore type of a first source and a second ore type of a second source through the conveyance network.

The conveyance network data further comprises transshipment nodes, wherein the conveyance network data comprises design configurations and operational configurations of the conveyance network, and wherein the grindline performance data is estimated grindline performance data. The routing logic is identified as binary or variable, wherein uninterrupted source-sink paths are configurable with fixed routing logic or variable routing logic; and wherein interrupted source-sink paths are configurable with variable speed routing logic.

The blending flow configuration is generated based on grindline performance data for the plurality of sink nodes, wherein the grindline performance data is associated with ore data of the plurality of source nodes, the ore data comprising mineralogical properties of an ore body.

An uninterrupted source-sink path label corresponds to a path configured with any of the following: no branching paths; branching paths with fixed routing logic and multiple destinations; and branching paths with variable routing logic and a single shared destination. An interrupted source-sink path label corresponds to a path configured with any of the following: branching paths with multiple destinations.

Generating the blending flow configuration further comprises: for interrupted source-sink paths, identifying source-sink paths that flow through an interrupting variable conveyer of the interrupted source-sink paths; selecting n possible blending ratios for the interrupting variable conveyer; constraining source-sinks paths that flow through the interrupting variable conveyer using an identical blending ratio of ore at a corresponding source node; and constraining the conveyance network to a corresponding variable speed routing logic; constraining the conveyance network to a fixed routing logic and variable routing logic associated with the uninterrupted source-sink paths; and based on constraining the network to the corresponding variable speed routing logic and constraining the conveyance network to the fixed routing logic and the variable routing logic, using a linear algorithm to assign the first ore type and the second ore type at the plurality of source node to the plurality of sink nodes. Based on the blending flow configuration updating, in real time via the material processing engine, blending ratios associated with the plurality of source nodes and the plurality of sink nodes.

Overflow Management Configuration—Embodiments

Embodiments described are directed to providing an overflow management configuration for a material processing system. Operationally, the method includes accessing, at a material processing engine, conveyance network data of a conveyance network, the conveyance network data comprising a plurality of source nodes, a plurality of sink nodes, and a plurality of network edges of the conveyance network; based on the conveyance network data, identifying routing logic between the plurality of network edges of the conveyance network; based on the routing logic, determining a surge flow routing logic corresponding to each of the plurality of network edges; accessing grindline performance data for the plurality of sink nodes, wherein the grindline performance data is associated with ore data of the plurality of source nodes, the ore data comprising mineralogical properties of an ore body; determining an expected amount of ore from the plurality of sources; and based on the routing logic between the plurality edges, the surge flow routing logic, grindline performance data, and the expected amount of ore, generating an overflow management configuration comprising overflow risk data for the plurality of source nodes.

The conveyance network data further comprises transshipment nodes, wherein the conveyance network data comprises design configurations and operational configurations of the conveyance network, wherein the conveyance network combines at least two source nodes of the plurality of source nodes to one sink node of the plurality of sink nodes.

The routing logic is identified as binary or variable, wherein the plurality of network edges correspond to a plurality of network arcs each labeled as an uninterrupted source-sink path or an interrupted source-sink path, wherein uninterrupted source-sink paths are configurable with fixed routing logic or variable routing logic; and wherein interrupted source-sink paths are configurable with variable speed routing logic.

Determining the surge flow routing logic is based on the following: if a network edge has a binary routing logic, the surge flow routing logic is such that surge only flows in a direction that ore is flowing; and if a network edge has a variable routing logic, a binary direction is identified and the surge flow routing logic is such that surge risk flow is in the binary direction.

Determining the amount of expected ore is based on formalizing ore delivery at the plurality of sources, wherein formalizing ore delivery comprises determining a fixed batch sizes that is either surging or at rest. Determining an amount of expected ore is a function of: fixed batch sizes associated with the plurality of sources. The overflow management configuration minimizes conveyor overflow risk due to inconsistent ore processing rates while meeting stockpile height requirements.

The method further comprises identifying an active network edge from the plurality of network edge; identifying a surge flow routing logic for the active network edge; based on the surge flow routing logic, determining one or more of the plurality of source nodes that pose a risk; determining a maximum overflow risk for the active network edge as a function of a simultaneous surge of the one or more of the plurality source nodes that pose the risk; constraining, via the material processing engine, the conveyance network such that nodes of the conveyance network do not have a maximum overflow risk; and constraining the amount of expected ore to meet stockpile height requirement associated with the plurality of sink nodes.

Example Distributed Computing System Environment

Figure 6:
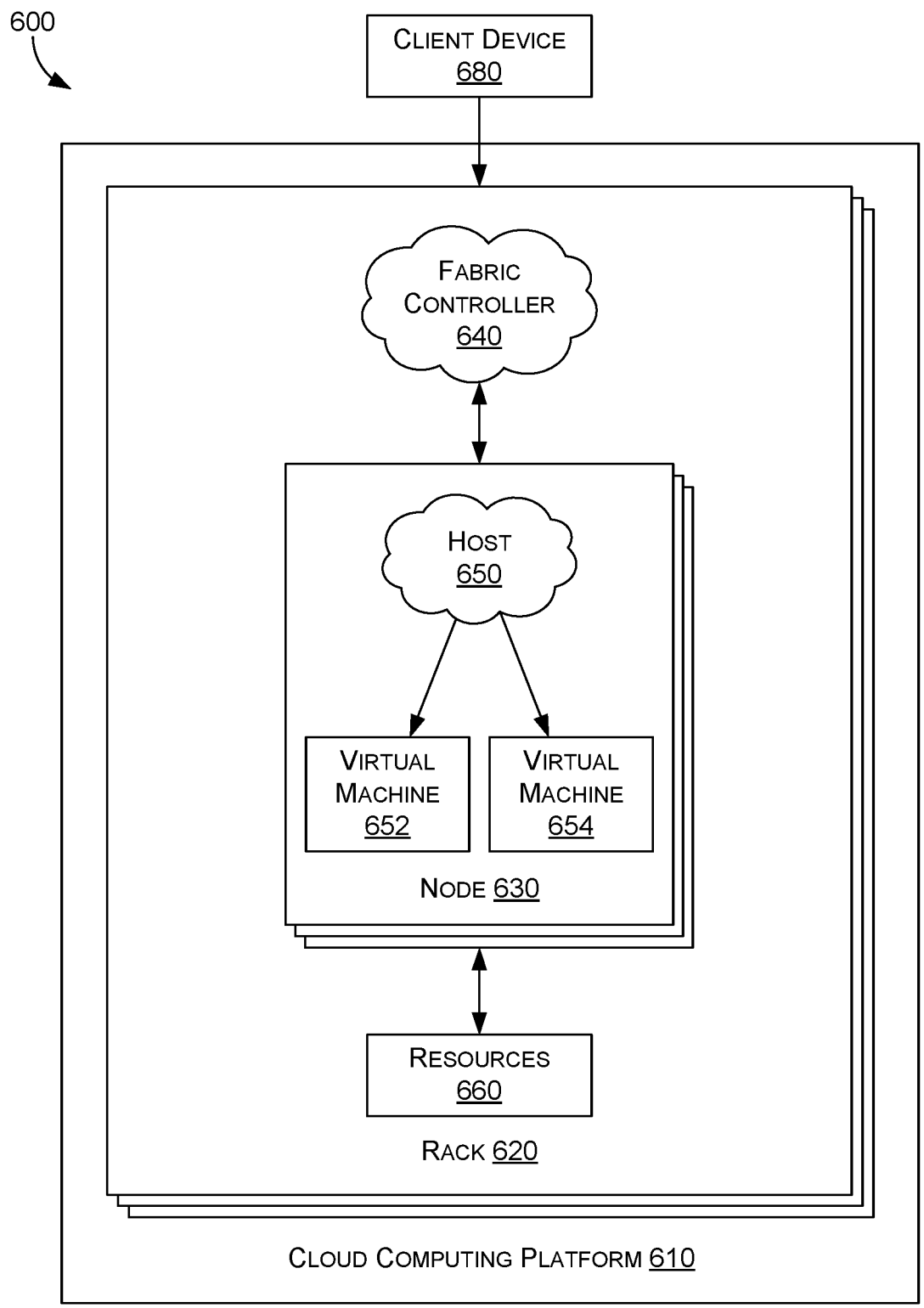
FIG. 6 provides a block diagram of an exemplary distributed computing environment suitable for use in implementing aspects of the technology described herein.

Referring now to FIG. 6, FIG. 6 illustrates an example distributed computing environment 600 in which implementations of the present disclosure may be employed. In particular, FIG. 6 shows a high level architecture of an example cloud computing platform 610 that can host a technical solution environment, or a portion thereof (e.g., a data trustee environment). It should be understood that this and other arrangements described herein are set forth only as examples. For example, as described above, many of the elements described herein may be implemented as discrete or distributed components or in conjunction with other components, and in any suitable combination and location. Other arrangements and elements (e.g., machines, interfaces, functions, orders, and groupings of functions) can be used in addition to or instead of those shown.

Data centers can support distributed computing environment 600 that includes cloud computing platform 610, rack 620, and node 630 (e.g., computing devices, processing units, or blades) in rack 620. The technical solution environment can be implemented with cloud computing platform 610 that runs cloud services across different data centers and geographic regions. Cloud computing platform 610 can implement fabric controller 640 component for provisioning and managing resource allocation, deployment, upgrade, and management of cloud services. Typically, cloud computing platform 610 acts to store data or run service applications in a distributed manner. Cloud computing infrastructure 610 in a data center can be configured to host and support operation of endpoints of a particular service application. Cloud computing infrastructure 610 may be a public cloud, a private cloud, or a dedicated cloud.

Node 630 can be provisioned with host 650 (e.g., operating system or runtime environment) running a defined software stack on node 630. Node 630 can also be configured to perform specialized functionality (e.g., compute nodes or storage nodes) within cloud computing platform 610. Node 630 is allocated to run one or more portions of a service application of a tenant. A tenant can refer to a customer utilizing resources of cloud computing platform 610. Service application components of cloud computing platform 610 that support a particular tenant can be referred to as a tenant infrastructure or tenancy. The terms service application, application, or service are used interchangeably herein and broadly refer to any software, or portions of software, that run on top of, or access storage and compute device locations within, a datacenter.

When more than one separate service application is being supported by nodes 630, nodes 630 may be partitioned into virtual machines (e.g., virtual machine 652 and virtual machine 654). Physical machines can also concurrently run separate service applications. The virtual machines or physical machines can be configured as individualized computing environments that are supported by resources 660 (e.g., hardware resources and software resources) in cloud computing platform 610. It is contemplated that resources can be configured for specific service applications. Further, each service application may be divided into functional portions such that each functional portion is able to run on a separate virtual machine. In cloud computing platform 610, multiple servers may be used to run service applications and perform data storage operations in a cluster. In particular, the servers may perform data operations independently but exposed as a single device referred to as a cluster. Each server in the cluster can be implemented as a node.

Client device 680 may be linked to a service application in cloud computing platform 610. Client device 680 may be any type of computing device, which may correspond to computing device 600 described with reference to FIG. 6, for example, client device 680 can be configured to issue commands to cloud computing platform 610. In embodiments, client device 680 may communicate with service applications through a virtual Internet Protocol (IP) and load balancer or other means that direct communication requests to designated endpoints in cloud computing platform 610. The components of cloud computing platform 610 may communicate with each other over a network (not shown), which may include, without limitation, one or more local area networks (LANs) and/or wide area networks (WANs).

Example Distributed Computing Environment

Having briefly described an overview of embodiments of the present invention, an example operating environment in which embodiments of the present invention may be implemented is described below in order to provide a general context for various aspects of the present invention. Referring initially to FIG. 7 in particular, an example operating environment for implementing embodiments of the present invention is shown and designated generally as computing device 700. Computing device 700 is but one example of a suitable computing environment and is not intended to suggest any limitation as to the scope of use or functionality of the invention. Neither should computing device 700 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc. refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

Figure 7:
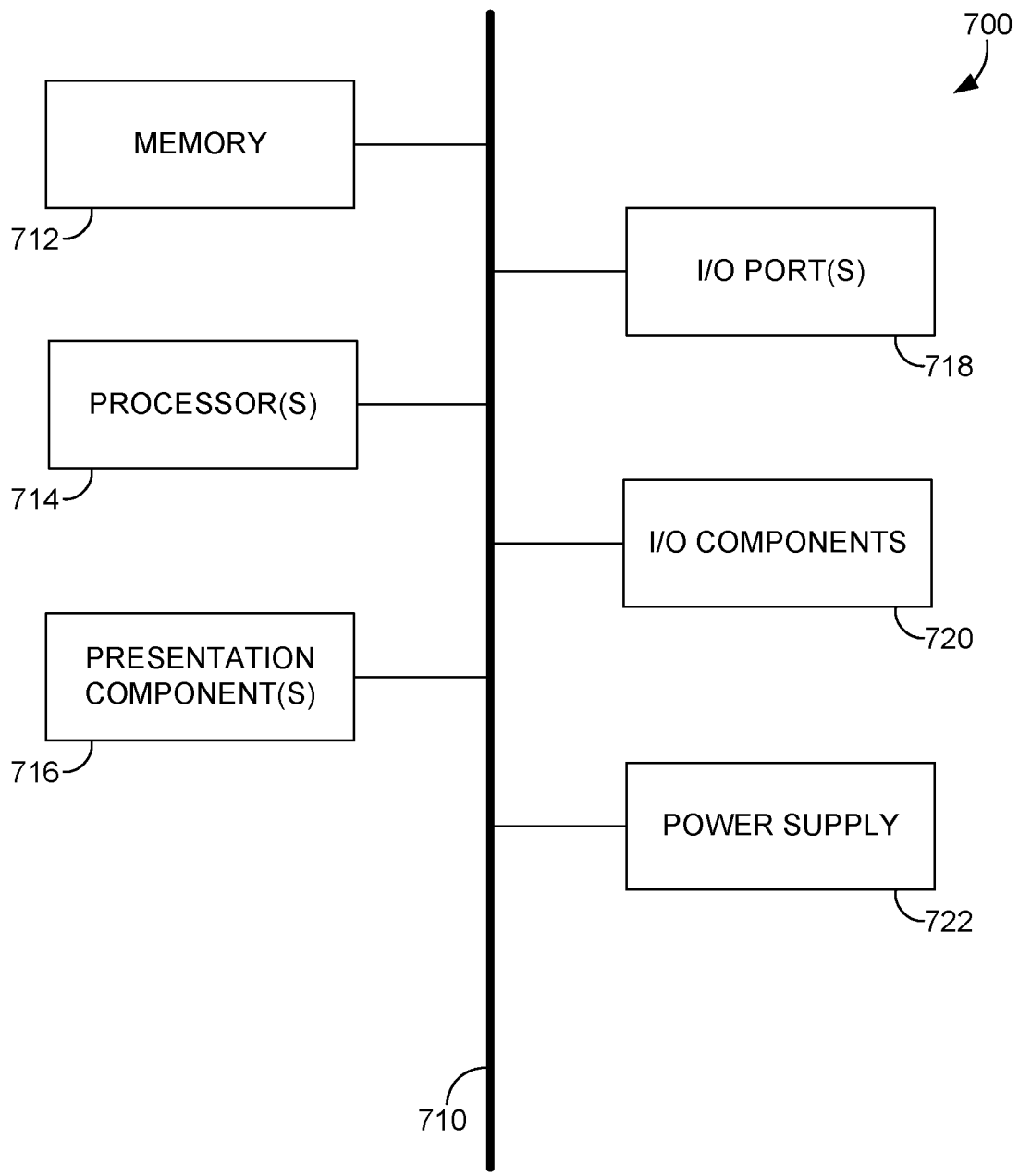
FIG. 7 is a block diagram of an exemplary computing environment suitable for use in implementing aspects of the technology described herein.

With reference to FIG. 7, computing device 700 includes bus 710 that directly or indirectly couples the following devices: memory 712, one or more processors 714, one or more presentation components 716, input/output ports 718, input/output components 720, and illustrative power supply 722. Bus 710 represents what may be one or more buses (such as an address bus, data bus, or combination thereof). The various blocks of FIG. 7 are shown with lines for the sake of conceptual clarity, and other arrangements of the described components and/or component functionality are also contemplated. For example, one may consider a presentation component such as a display device to be an I/O component. Also, processors have memory. We recognize that such is the nature of the art, and reiterate that the diagram of FIG. 7 is merely illustrative of an example computing device that can be used in connection with one or more embodiments of the present invention. Distinction is not made between such categories as "workstation," "server," "laptop," "hand-held device," etc., as all are contemplated within the scope of FIG. 7 and reference to "computing device."

Computing device 700 typically includes a variety of computer-readable media. Computer-readable media can be any available media that can be accessed by computing device 700 and includes both volatile and nonvolatile media, removable and non-removable media. By way of example, and not limitation, computer-readable media may comprise computer storage media and communication media.

Computer storage media include volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 700. Computer storage media excludes signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 712 includes computer storage media in the form of volatile and/or nonvolatile memory. The memory may be removable, non-removable, or a combination thereof. Exemplary hardware devices include solid-state memory, hard drives, optical-disc drives, etc. Computing device 700 includes one or more processors that read data from various entities such as memory 712 or I/O components 720. Presentation component(s) 716 present data indications to a user or other device. Exemplary presentation components include a display device, speaker, printing component, vibrating component, etc.

I/O ports 718 allow computing device 700 to be logically coupled to other devices including I/O components 720, some of which may be built in. Illustrative components include a microphone, joystick, game pad, satellite dish, scanner, printer, wireless device, etc.

Additional Structural and Functional Features of Embodiments of the Technical Solution Having identified various components utilized herein, it should be understood that any number of components and arrangements may be employed to achieve the desired functionality within the scope of the present disclosure. For example, the components in the embodiments depicted in the figures are shown with lines for the sake of conceptual clarity. Other arrangements of these and other components may also be implemented. For example, although some components are depicted as single components, many of the elements described herein may be implemented as discrete or distributed components or in conjunction with other components, and in any suitable combination and location. Some elements may be omitted altogether. Moreover, various functions described herein as being performed by one or more entities may be carried out by hardware, firmware, and/or software, as described below. For instance, various functions may be carried out by a processor executing instructions stored in memory. As such, other arrangements and elements (e.g., machines, interfaces, functions, orders, and groupings of functions) can be used in addition to or instead of those shown.

Embodiments described in the paragraphs below may be combined with one or more of the specifically described alternatives. In particular, an embodiment that is claimed may contain a reference, in the alternative, to more than one other embodiment. The embodiment that is claimed may specify a further limitation of the subject matter claimed.

The subject matter of embodiments of the invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

For purposes of this disclosure, the word "including" has the same broad meaning as the word "comprising," and the word "accessing" comprises "receiving," "referencing," or "retrieving." Further the word "communicating" has the same broad meaning as the word "receiving," or "transmitting" facilitated by software or hardware-based buses, receivers, or transmitters using communication media described herein. In addition, words such as "a" and "an," unless otherwise indicated to the contrary, include the plural as well as the singular. Thus, for example, the constraint of "a feature" is satisfied where one or more features are present. Also, the term "or" includes the conjunctive, the disjunctive, and both (a or b thus includes either a or b, as well as a and b).

For purposes of a detailed discussion above, embodiments of the present invention are described with reference to a distributed computing environment; however the distributed computing environment depicted herein is merely exemplary. Components can be configured for performing novel aspects of embodiments, where the term "configured for" can refer to "programmed to" perform particular tasks or implement particular abstract data types using code. Further, while embodiments of the present invention may generally refer to the technical solution environment and the schematics described herein, it is understood that the techniques described may be extended to other implementation contexts.

Embodiments of the present invention have been described in relation to particular embodiments which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects hereinabove set forth together with other advantages which are obvious and which are inherent to the structure.

It will be understood that certain features and sub-combinations are of utility and may be employed without reference to other features or sub-combinations. This is contemplated by and is within the scope of the claims.

What is claimed is:

1. A computerized system comprising:
   one or more computer processors; and
   computer memory storing computer-useable instructions that, when used by the one or more computer processors, cause the one or more computer processors to perform operations comprising:
   accessing, at a material processing engine, conveyance network data of a conveyance network, the conveyance network data comprising a plurality of source nodes, a plurality of sink nodes, and a plurality of network edges of the conveyance network, wherein the conveyance network combines at least two source nodes of the plurality of source nodes to one sink node of the plurality of sink nodes;
   based on the conveyance network data, identifying routing logic between the plurality of network edges of the conveyance network, wherein the plurality of network edges correspond to a plurality of network arcs each labeled as an uninterrupted source-sink path or an interrupted source-sink path; and
   based on the routing logic between the plurality edges and the labels associated with the plurality of network arcs, generating a blending flow configuration comprising routing data for a first ore type of a first source and a second ore type of a second source through the conveyance network, wherein generating the blending flow configuration comprises:
   for interrupted source-sink paths, identifying source-sink paths that flow through an interrupting variable conveyer of the interrupted source-sink paths;
   selecting n possible blending ratios for the interrupting variable conveyer;
   constraining source-sinks paths that flow through the interrupting variable conveyer using an identical blending ratio of ore at a corresponding source node; and
   constraining the conveyance network to a corresponding variable speed routing logic.

2. The system of claim 1, wherein the conveyance network data further comprises transshipment nodes, wherein the conveyance network data comprises design configurations and operational configurations of the conveyance network, and
   wherein the operations further comprise estimating grindline performance data for the plurality of sink nodes.

3. The system of claim 1, wherein the routing logic is identified as binary or variable, wherein uninterrupted source-sink paths are configurable with fixed routing logic or variable routing logic, and wherein interrupted source-sink paths are configurable with variable speed routing logic.

4. The system of claim 1, wherein the blending flow configuration is generated based on grindline performance data for the plurality of sink nodes, wherein the grindline performance data is associated with ore data of the plurality of source nodes, the ore data comprising mineralogical properties of an ore body.

5. The system of claim 1, wherein an uninterrupted source-sink path label corresponds to a path configured with any of the following:
   no branching paths;
   branching paths with fixed routing logic and multiple destinations; and
   branching paths with variable routing logic and a single shared destination.

6. The system of claim 1, wherein an interrupted source-sink path label corresponds to a path configured with any of the following:
   branching paths with multiple destinations.

7. The system of claim 1, the operations further comprising:
   constraining the conveyance network to a fixed routing logic and variable routing logic associated with the uninterrupted source-sink paths.

8. The system of claim 7, the operations further comprising, based on constraining the network to the corresponding variable speed routing logic and constraining the conveyance network to the fixed routing logic and the variable routing logic, using a linear algorithm to assign the first ore type and the second ore type at the plurality of source node to the plurality of sink nodes.

9. The system of claim 1, the operations further comprising:
based on the blending flow configuration updating, in real time via the material processing engine, blending ratios associated with the plurality of source nodes and the plurality of sink nodes.

10. One or more non-transitory computer-storage media having computer-executable instructions embodied thereon that, when executed by a computing system having a processor and memory, cause the processor to:
access, at a material processing engine, conveyance network data of a conveyance network, the conveyance network data comprising a plurality of source nodes, a plurality of sink nodes, and a plurality of network edges of the conveyance network, wherein the conveyance network combines at least two source nodes of the plurality of source nodes to one sink node of the plurality of sink nodes;
based on the conveyance network data, identify routing logic between the plurality of network edges of the conveyance network, wherein the plurality of network edges corresponds to a plurality of network arcs each labeled as an uninterrupted source-sink path or an interrupted source-sink path; and
based on the routing logic between the plurality edges and the labels associated with the plurality of network arcs, generate a blending flow configuration comprising routing data for a first ore type of a first source and a second ore type of a second source through the conveyance network, wherein generating a blending flow configuration further comprises:
for interrupted source-sink paths, identifying source-sink paths that flow through an interrupting variable conveyer of the interrupted source-sink paths;
selecting n possible blending ratios for the interrupting variable conveyer;
constraining source-sinks paths that flow through the interrupting variable conveyer using an identical blending ratio corresponding to a corresponding source node; and
constraining the conveyance network to a corresponding variable speed routing logic.

11. The one or more non-transitory computer-storage media of claim 10, wherein the blending flow configuration is generated based on grindline performance data for the plurality of sink nodes, wherein the grindline performance data is associated with ore data of the plurality of source nodes, the ore data comprising mineralogical properties of an ore body.

12. The one or more non-transitory computer-storage media of claim 10, further comprising causing the processor to:
based on constraining the network to the corresponding variable speed routing logic, using a linear algorithm to assign the first ore type and the second ore type at the plurality of source node to the plurality of sink nodes.

13. The one or more non-transitory computer-storage media of claim 10, further comprising causing the processor to:
based on the blending flow configuration update, in real time via the material processing engine, blending ratios associated with the plurality of source nodes and the plurality of sink nodes.

14. A computer-implemented method, the method comprising:
accessing, at a material processing engine, conveyance network data of a conveyance network, the conveyance network data comprising a plurality of source nodes, a plurality of sink nodes, and a plurality of network edges of the conveyance network, wherein the conveyance network combines at least two source nodes of the plurality of source nodes to one sink node of the plurality of sink nodes;
based on the conveyance network data, identifying routing logic between the plurality of network edges of the conveyance network, wherein the plurality of network edges correspond to a plurality of network arcs each labeled as an uninterrupted source-sink path or an interrupted source-sink path; and
based on the routing logic between the plurality edges and the labels associated with the plurality of network arcs, generating a blending flow configuration comprising routing data for a first ore type of a first source and a second ore type of a second source through the conveyance network, wherein generating a blending flow configuration further comprises:
for interrupted source-sink paths, identifying source-sink paths that flow through an interrupting variable conveyer of the interrupted source-sink paths;
selecting n possible blending ratios for the interrupting variable conveyer;
constraining source-sinks paths that flow through the interrupting variable conveyer using an identical blending ratio corresponding to a corresponding source node; and
constraining the conveyance network to a corresponding variable speed routing logic.

15. The method of claim 14, wherein the blending flow configuration is generated based on a non-linear problem that obviates using n discrete blending ratios.

16. The method of claim 14, the method further comprising:
based on constraining the network to the corresponding variable speed routing logic, using a linear algorithm to assign the first ore type and the second ore type at the plurality of source node to the plurality of sink nodes.

17. The method of claim 14, the method further comprising:
based on the blending flow configuration update, in real time via the material processing engine, blending ratios associated with the plurality of source nodes and the plurality of sink nodes.

* * * * *